US012794988B2

(12) United States Patent
Banerjee et al.

(10) Patent No.: US 12,794,988 B2
(45) **Date of Patent: *Nov. 10, 2026**

(54) PROVISIONING MULTIPLE CLOUD-BASED SERVICES TO CONTROL DEVICES

(71) Applicant: Lutron Technology Company LLC, Coopersburg, PA (US)

(72) Inventors: Agniva Banerjee, Easton, PA (US); John Nill, Emmaus, PA (US); Christopher Jon Oster, Langhorne, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 98 days.

This patent is subject to a terminal disclaimer.

(21) Appl. No.: 19/027,166

(22) Filed: Jan. 17, 2025

(65) Prior Publication Data

US 2025/0168236 A1 May 22, 2025

Related U.S. Application Data

(63) Continuation of application No. 16/938,472, filed on Jul. 24, 2020, now Pat. No. 12,250,275.

(Continued)

(51) Int. Cl.
*H04L 67/141* (2022.01)
*H04L 67/025* (2022.01)

(52) U.S. Cl.
CPC .......... *H04L 67/141* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 9,432,437 B1 | 8/2016 | Leonard | |
| 10,079,839 B1 | 9/2018 | Bryan et al. | |

(Continued)

FOREIGN PATENT DOCUMENTS

| | | | |
|---|---|---|---|
| GB | 2471883 | A | 1/2011 |
| WO | 2018232111 | A1 | 12/2018 |

OTHER PUBLICATIONS

3GPP TS 24.229 V11.2.0, "IP multimedia call control protocol based on Session Initiation Protocol (SIP) and Session Description Protocol (SDP); Stage 3 (Release 11)", 3rd Generation Partnership Project (3GPP); Technical Specification Group Core Network and Terminals, Dec. 2011, 712 pages.

(Continued)

*Primary Examiner* — Tonia L Dollinger
*Assistant Examiner* — Ishrat Rashid
(74) *Attorney, Agent, or Firm* — Condo Roccia Koptiw LLP

(57) ABSTRACT

Systems and methods are disclosed herein for a provisioning service, such as a broker provisioner service (BPS), for provisioning a device (e.g., such as a control device and/or a mobile device) to one or more remote servers. The device may send a connection request message to the BPS to be provisioned with the remote servers (e.g., one or more services offered by the remote servers). The BPS may determine one or more services and/or brokers associated with the corresponding remote servers with which the device may be provisioned, e.g., based on provisioning rules. The BPS may apply the provisioning rules to determine the appropriate services and/or brokers and the corresponding remote servers with which the device may be provisioned. The BPS may send a provision message to the device. The device may establish communications with the provisioned (Continued)

services and/or brokers and/or the corresponding remote servers.

21 Claims, 9 Drawing Sheets

Related U.S. Application Data

(60) Provisional application No. 62/879,166, filed on Jul. 26, 2019.

(56) References Cited

U.S. PATENT DOCUMENTS

| | | | | |
|---|---|---|---|---|
| 10,447,492 | B1 | 10/2019 | Jacobson et al. | |
| 2003/0120723 | A1 | 6/2003 | Bright et al. | |
| 2010/0076615 | A1* | 3/2010 | Daniel | F03D 9/25 703/2 |
| 2014/0095592 | A1 | 4/2014 | Hartrick et al. | |
| 2015/0281123 | A1* | 10/2015 | He | H04L 67/125 709/226 |
| 2017/0201375 | A1 | 7/2017 | Amin et al. | |
| 2017/0280534 | A1 | 9/2017 | Dimberg et al. | |
| 2017/0288599 | A1 | 10/2017 | Chapman et al. | |
| 2018/0167435 | A1 | 6/2018 | Kinarti et al. | |
| 2018/0259922 | A1 | 9/2018 | Nill et al. | |
| 2018/0331828 | A1 | 11/2018 | Pakkan et al. | |
| 2020/0145409 | A1 | 5/2020 | Pochuev et al. | |

OTHER PUBLICATIONS

TS 24.229 V11.2.0, "3rd Generation Partnership Project (3GPP)", Technical Specification Group Core Network and Terminals, IP multimedia call control protocol based on Session Initiation Protocol (SIP) and Session Description Protocol (SDP), Stage 3 (Release 11), Dec. 2011.

* cited by examiner

PROVISIONING MULTIPLE CLOUD-BASED SERVICES TO CONTROL DEVICES

CROSS-REFERENCE TO RELATED APPLICATIONS

This application is a continuation of patent application U.S. Ser. No. 16/938,472 (now U.S. Pat. No. 12,250,275), which claims the benefit of provisional patent application U.S. Ser. No. 62/879,166, filed Jul. 26, 2019, the disclosures of each of which are incorporated by reference herein in their entireties.

BACKGROUND

A load control environment, such as a residence, an office building, or a hotel for example, may be configured to include various types of load control systems. The load control environment may include control devices that are associated with input devices for communicating control instructions for controlling an electrical load. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment.

SUMMARY

Systems and methods are disclosed herein for a control device establishing a communication channel with a remote server via a broker service. The control device may connect with the broker service, such as a broker provisioner service (BPS). The broker service or the BPS may receive a message from the control device indicating that the control device wants to be provisioned and communicates with the provisioned remote servers. The BPS may have information about the remote servers that the control device may connect to. For example, the BPS may receive messages from the remote servers (e.g., periodically) indicating one or more services offered by the remote servers. The BPS may provision (e.g., facilitate) connections between the control device and the remote servers.

The control device may send a connection request message to the BPS. The control device may send the connection request message to the BPS when the control device first powers on, or after a power cycle, or periodically. The control device may include information about the control device, such as a device ID, a device type, serial number, a MAC address, location information, authorization information, etc., that identifies the control device to the BPS.

The BPS may have information about the remote servers that the control device may connect to. For example, the BPS may receive information about one or more services offered by the remote servers. The BPS may have one or more brokers associated with corresponding remote servers that the control device may connect to. The BPS may determine one or more services/brokers and the corresponding remote servers that the control device may be provisioned with to establish communications (e.g., in response to receiving the connection request message from the control device). For example, the BPS may determine a set of remote servers that the control device may communicate with by applying provisioning rules based on the information about the control device. Based on the determination, the BPS may perform provisioning procedures. For example, the BPS may send connection establishment request messages to the services/brokers and the corresponding remote servers (e.g., on behalf of the control device).

The BPS may send a provision message back to the control device. The provision message may include information about the provisioned connection between the control device and the services/brokers and the corresponding remote servers by the BPS. The provision message may include information for the control device on how to connect to the provisioned remote servers. For example, the provision message may include service IDs, broker IDs, topic IDs, subscription credentials, etc. The provision message may also include an indication to the control device to connect to one or more (e.g., each) services/brokers that was provisioned. The provision message may include an indication to connect to either one of the services/brokers that was provisioned. The provision message may include an indication to connect to a compound set of the services/brokers that was provisioned. The compound set of the services brokers may indicate the control device to connect to one or more brokers associated with a remote server and connect to one or more brokers associated with another remote server.

When the control device connects to the BPS and the BPS determines and performs communication establishment between the control device and the remote servers, the control device may quickly and efficiently update the remote servers and/or the services if any changes occur on the remote servers and/or the services.

The control device may execute multi-server firmware and establish communication with the services on the remote servers based on the provision messages. The control device may establish multiple parallel connections on the multiple services offered by multiple remote servers (e.g., that are provisioned by the BPS).

Communications between the control device, the BPS, and the remote servers may be done with a messaging-based interface, such as a message queue telemetry transport (MQTT) interface.

The above features are of representative embodiments and may not be considered limitations.

DETAILED DESCRIPTION

Figure 1:
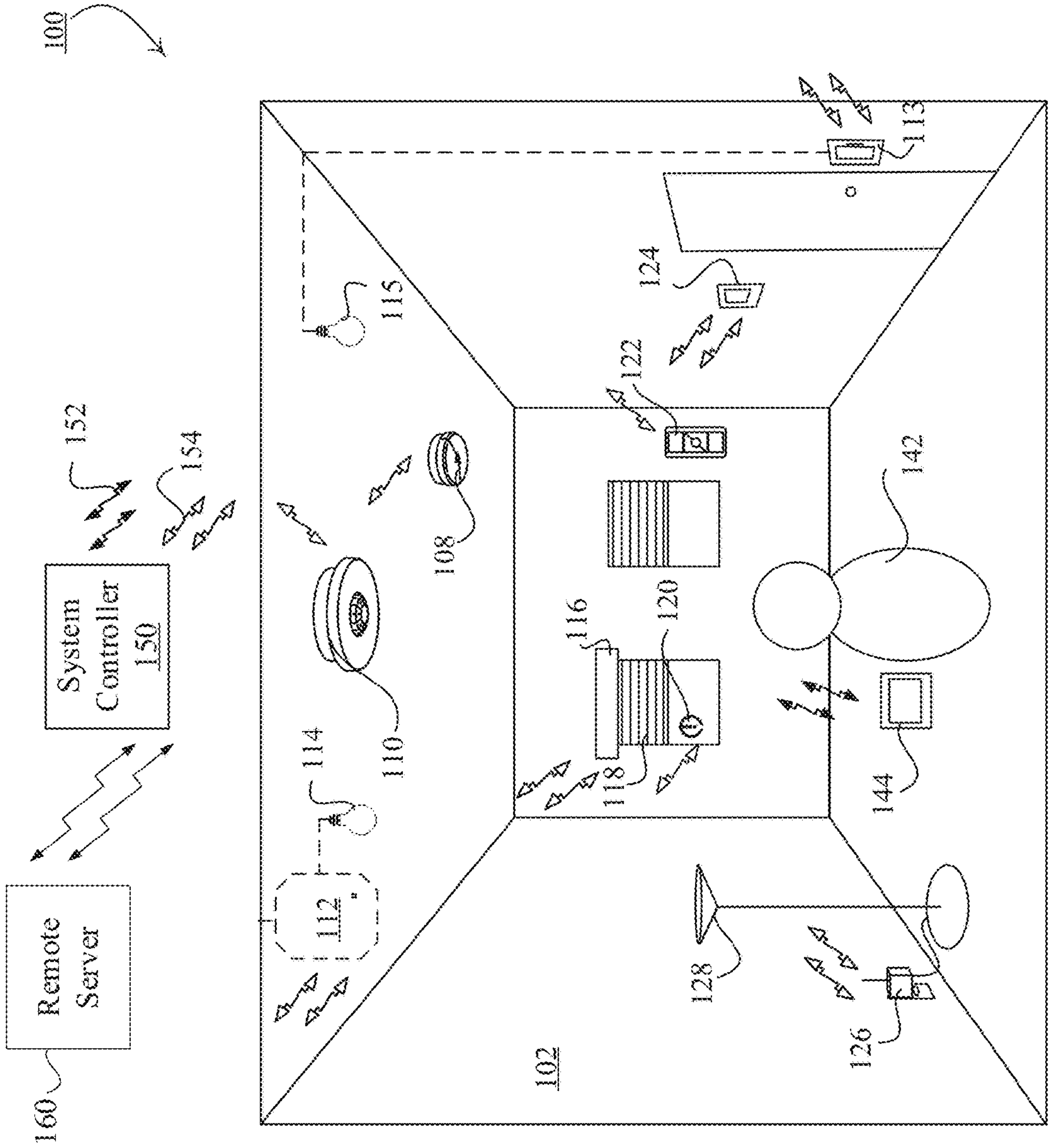
FIG. 1 is a system diagram that illustrates an example load control system.

FIG. 1 shows a system diagram of an example load control system 100. Load control system 100 may include control devices (e.g., a system controller 150, input devices, and/or load control devices) for controlling (e.g., directly and/or indirectly) one or more electrical loads in a user environment 102 (also referred to herein as a load control environment). Example user environments/load control environments 102 may include one or more rooms of a home, one or more floors of a building, one or rooms of a hotel, etc. As one example, load control system 100 may enable the automated control of lighting systems, shades, and heating, ventilating, and air conditioning (HVAC) systems in the user environment, among other electrical loads.

The control devices of load control system 100 may include a system controller 150, control-source devices (e.g., elements 108, 110, 120, and 122 discussed below), and control-target devices (e.g., elements 112, 113, 116, 124, and 126 discussed below) (control-source devices and control-target devices may be individually and/or collectively referred to herein as load control devices and/or control devices). The system controller 150, the control-source devices, and the control-target devices may be configured to communicate (transmit and/or receive) messages, such as digital messages (although other types of messages may be communicated), between one another using wireless signals 154 (e.g., radio-frequency (RF) signals), although wired communications may also be used.

The control-source devices may include, for example, input devices that are configured to detect conditions within the user environment 102 (e.g., user inputs via switches, occupancy/vacancy conditions, changes in measured light intensities, and/or other input information) and in response to the detected conditions, transmit digital messages to control-target devices that are configured to control electrical loads in response to instructions or commands received in the digital messages. The control-target devices may include, for example, load control devices that are configured to receive digital messages from the control-source devices and/or the system controller 150 and to control respective electrical loads in response to the received digital messages. A single control device of the load control system 100 may operate as both a control-source device and a control-target device.

According to one example, the system controller 150 may be configured to receive the digital messages transmitted by the control-source devices, to interpret these messages based on a configuration of the load control system, and to then transmit digital messages to the control-target devices for the control-target devices to then control respective electrical loads. In other words, the control-source devices and the control-target device may communicate via the system controller 150. According to another and/or additional example, the control-source devices may directly communicate with the control-target devices without the assistance of the system controller 150. The system controller may still monitor such communications. According to a further and/or additional example, the system controller 150 may originate and then communicate digital messages with control-source devices and/or control-target devices. Such communications by the system controller 150 may include programming/configuration data (e.g., settings) for the control devices, such as configuring scene buttons on light switches. Communications from the system controller 150 may also include, for example, messages directed to control-target devices and that contain instructions or commands for the control-target devices to control respective electrical loads in response to the received messages. For example, the system controller 150 may communicate messages to change light levels, to change shade levels, to change HVAC settings, etc. These are examples and other examples are possible.

Communications between the system controller 150, the control-source devices, and the control-target devices may be via a wired and/or wireless communications network as indicated above. One example of a wireless communications network may be a wireless LAN where the system controller, control-source devices, and the control-target devices may communicate via a router, for example, that is local to the user environment 102. For example, such a network may be a standard Wi-Fi network. Another example of a wireless communications network may be a point-to-point communications network where the system controller, control-source devices, and the control-target devices communicate directly with one another using, for example, Bluetooth, Wi-Fi Direct, Thread, Zigbee, a proprietary communication channel, such as CLEAR CONNECT™, etc. to directly communicate. Another example of a wireless communications network may be using radio frequency (RF) communications, such as Zigbee communications, near field communication (NFC), Bluetooth, Wi-Fi, etc. Other network configurations may be used such as the system controller acting as an access point and providing one or more wireless/wired based networks through which the system controller, the control-source devices, and the control-target devices may communicate.

For a control-target device to be responsive to messages from a control-source device, the control-source device may first be associated with the control-target device. As one example of an association procedure, a control-source device may be associated with a control-target device by a user 142 actuating a button on the control-source device and/or the control-target device. The actuation of the button on the control-source device and/or the control-target device may place the control-source device and/or the control-target device in an association mode for being associated with one another. In the association mode, the control-source device may transmit an association message to the control-target device (directly or through the system controller). The association message from the control-source device may include a unique identifier of the control-source device. The control-target device may locally store the unique identifier of the control-source, such that the control-target device may be capable of recognizing digital messages (e.g., subsequent digital messages) from the control-source device that may include load control instructions or commands. The control-target device may be configured to respond to the digital messages from the associated control-source device by controlling a corresponding electrical load according to the load control instructions received in the digital messages. This is merely one example of how control devices may communicate and be associated with one another and other examples are possible. According to another example, the system controller 150 may receive configuration instructions from a user that specify which control-source devices should control which control-target devices. Thereafter, the system controller may communicate this configuration information to the control-source devices and/or control-target devices.

As one example of a control-target device, load control system 100 may include one or more lighting control devices, such as the lighting control devices 112 and 113. The lighting control device 112 may be a dimmer switch, an electronic switch, a ballast, a light emitting diode (LED) driver, and/or the like. The lighting control device 112 may be configured to directly control an amount of power provided to a lighting load(s), such as lighting load 114. The lighting control device 112 may be configured to wirelessly receive digital messages via signals 154 (e.g., messages originating from a control-source device and/or the system controller 150), and to control the lighting load 114 in response to the received digital messages. One will recognize that lighting control device 112 and lighting load 114 may be integral and thus part of the same fixture or may be separate.

The lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115.

The lighting control device 113 may be configured to wirelessly receive digital messages via wireless signals 154 (e.g., messages originating from a control-source device and/or the system controller 150). The lighting control device 113 may be configured to control the lighting load 115 in response to the received digital messages.

The load control system 100 may include one or more other control-target devices, such as a motorized window treatment 116 for directly controlling the covering material 118 (e.g., via an electrical motor); ceiling fans; a table top or plug-in load control device 126 for directly controlling a floor lamp 128, a desk lamp, and/or other electrical loads that may be plugged into the plug-in load control device 126; and/or a temperature control device 124 (e.g., a thermostat) for directly controlling an HVAC system (not shown). The load control system 100 may also include an audio control device (e.g., a speaker system) and/or a video control device (e.g., a device capable of streaming video content). Again, these devices may be configured to wirelessly receive digital messages via wireless signals 154 (e.g., messages originating from a control-source device and/or the system controller 150). These devices may be configured to control respective electrical loads in response to the received digital messages.

Control-target devices, in addition to being configured to wirelessly receive digital messages via wireless signals and to control respective electrical loads in response to the received digital messages, may also be configured to wirelessly transmit digital messages via wireless signals (e.g., to the system controller 150 and/or an associated control device). A control-target device may communicate such messages to confirm receipt of messages and actions taken, to report status (e.g., light levels, shade positions, room temperatures), etc. Again, control-target devices may also communicate via wired communications.

With respect to control-source devices, the load control system 100 may include one or more remote-control devices 122, one or more occupancy sensors 110, one or more daylight sensors 108, and/or one or more window sensors 120. The control-source devices may wirelessly send or communicate digital messages via wireless signals, such as signals 154, to associated control-target devices for controlling an electrical load. The remote-control device 122 may send digital messages for controlling one or more control-target devices after actuation of one or more buttons on the remote-control device 122. One or more buttons may correspond to a preset scene for controlling the lighting load 115, for example. The occupancy sensor 110 may send digital messages to control-target devices in response to an occupancy and/or a vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside the user environment 102. For example, the window sensor 120 may detect when sunlight is directly shining into the window sensor 120, is reflected onto the window sensor 120, and/or is blocked by external means, such as clouds, trees, or a building. The window sensor 120 may send digital messages indicating the measured light level. The load control system 100 may include one or more other control-source devices. Again, one will recognize that control-source devices may also communicate via wired communications.

Turning again to the system controller 150, it may facilitate the communication of messages from control-source devices to associated control-target devices and/or monitor such messages as indicated above, thereby knowing when a control-source device detects an event and when a control-target device is changing the status/state of an electrical load. The system controller 150 may communicate programming/configuration information to the control devices. The system controller 150 may also be the source of control messages to control-target devices, for example, instructing the devices to control corresponding electrical loads. As one example of the latter, the system controller 150 may run one or more time-clock operations that automatically communicates messages to control-target devices based on configured schedules (e.g., commands to lighting control device 113 to adjust light 115, commands to motorized window treatment 116 for directly controlling the covering material 118, etc.). For description purposes, shades may be used herein to describe functions and features related to motorized window treatments. Nonetheless, one will recognize that features and functions described herein are applicable to other types of window coverings such as drapes, curtains, blinds, etc. Other examples are possible.

According to a further aspect of load control system 100, the system controller 150 may be configured to communicate with one or more network devices 144 in use by a user 142, for example. The network device 144 may include a personal computer (PC), a laptop, a tablet, a smart phone, or equivalent device. The system controller 150 and the network device 144 may communicate via a wired and/or wireless communications network. The communications network may be the same network used by the system controller and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc. Other examples are possible, such as the system controller acting as an access point and providing one or more wireless/wired based networks through which the system controller and the network device may communicate.

In general, the system controller 150 may be configured to allow a user 142 of the network device 144 to determine, for example, the configuration of the user environment 102 and load control system 100, such as rooms in the environment, which control devices are in which rooms (e.g., the location of the control devices within the user environment, such as which rooms), to determine the status and/or configuration of control devices (e.g., light levels, HVAC levels, shade levels), to configure the system controller (e.g., to change time clock schedules), to issue commands to the system controller in order to control and/or configure the control devices (e.g., change light levels, change HVAC levels, change shade levels, change presets, etc.), etc. Other examples are possible.

The load control system 100 of FIG. 1 may be configured such that the system controller 150 is capable of communicating with a network device 144 when that device is local to the system controller, in other words, for the two to directly communicate in a point-to-point fashion, or through a local network specific to the user environment 102 (such as a network provided by a router that is local to the user environment). A user of network device 144 may communicate with the system controller 150 and control the load control system 100 from remote locations, such as via the Internet or other public or private network. Third-party integrators may communicate with the system controller 150 in order to provide enhanced services to users of user environment 102. For example, a third-party integrator may provide other systems within user environment 102. It may be beneficial to integrate such systems with load control system 100.

A remote server 160 may be an online platform service provider, providing a service, such as a cloud service. Though a single remote server 160 is shown, one or more remote servers or computing devices may be implemented. As an example, the remote server 160 may be or may include an Amazon Web service (AWS), a Xively service, a Microsoft service, and/or the like, online platform services. The remote server 160 may have a communication channel or tunnel established with the control device (e.g., system controller 150, control-source devices, and/or control-target devices) and/or the network device 144 via a broker service (e.g., such as a broker provisioner service (BPS) discussed below). Once a connection between the remote server 160 and the control device and/or network device 144 has been established, the remote server 160 may communicate with the control device and/or the network device 144 using a messaging-based interface. For example, the remote server 160 may communicate with a control device and/or the network device 144 via a message queuing telemetry transport (MQTT) interface. The MQTT interface described herein is provided as an example; however, other messaging-based interfaces may be used.

It may be desirable to communicate with and control devices/systems from a remote server. A remote server may be an online based platform service provider, providing an online service, such as a cloud service. The control systems may be configured to connect directly to the remote server and communicate and/or control the control devices by the remote server. The remote server that the control devices/control systems are connected to and/or subscribed to may have problems. For example, the remote server may malfunction and go offline for a period of time. A service provider that owns the remote server may go out of business, be sold to another company, no longer provide services for the remote server, etc.

There may be a need to change or reassign the remote server, such as the cloud services offered by the remote server, to control the control systems efficiently. For example, if the control systems are subscribed to and communicate with the remote server, and the remote server is no longer available to provide the service, then each of the control devices in the control systems may have to be patched to change and reconfigure with a new remote server. Providing patching to the control systems to communicate with different cloud services each time services change may be time-consuming and inefficient. Patches may need to be created for each control system and each control device in the control systems. The patches may be applied via the Internet. The patches may need to be applied via technicians. The patches may not work properly, and the technicians may need to address them individually. Also, even after applying the patches, the new remote server to which the control systems are newly subscribed may run into the same or similar issues, such as malfunctions, going offline, and/or ending its service, and the control systems may need to go through the same time-consuming process again for another remote server.

There may also be a need to quickly reconfigure the remote server for control of the systems. As described above, even after applying the patches on the control systems to reconfigure their connections to the new remote server, that new remote server may go offline and/or may no longer provide services as well. New patches may need to be created for and applied to the control systems. The control systems may need to be reconfigured to subscribe to and/or connect with another remote server. Problems that may arise as a result of applying the new patches and/or reconfiguring the control systems must be addressed.

Further, there may be a need for the control systems to connect to multiple remote servers (e.g., cloud services) simultaneously, depending on the types of control systems and/or the level of importance of the data communications between the control systems and the remote servers. Because control systems and/or communication conditions may change suddenly, there may be a need for the control systems to adapt to changes quickly and easily, to have multiple parallel connections, and/or to have connections with multiple remote servers, etc.

As discussed below, systems and methods disclosed herein may have a control device and/or a mobile device establishing communication channels with one or more remote servers via a broker service, such as a BPS. The BPS may provision the devices (e.g., control devices and/or the mobile devices) with the remote servers and associated services offered by the remote servers.

Figure 2A:
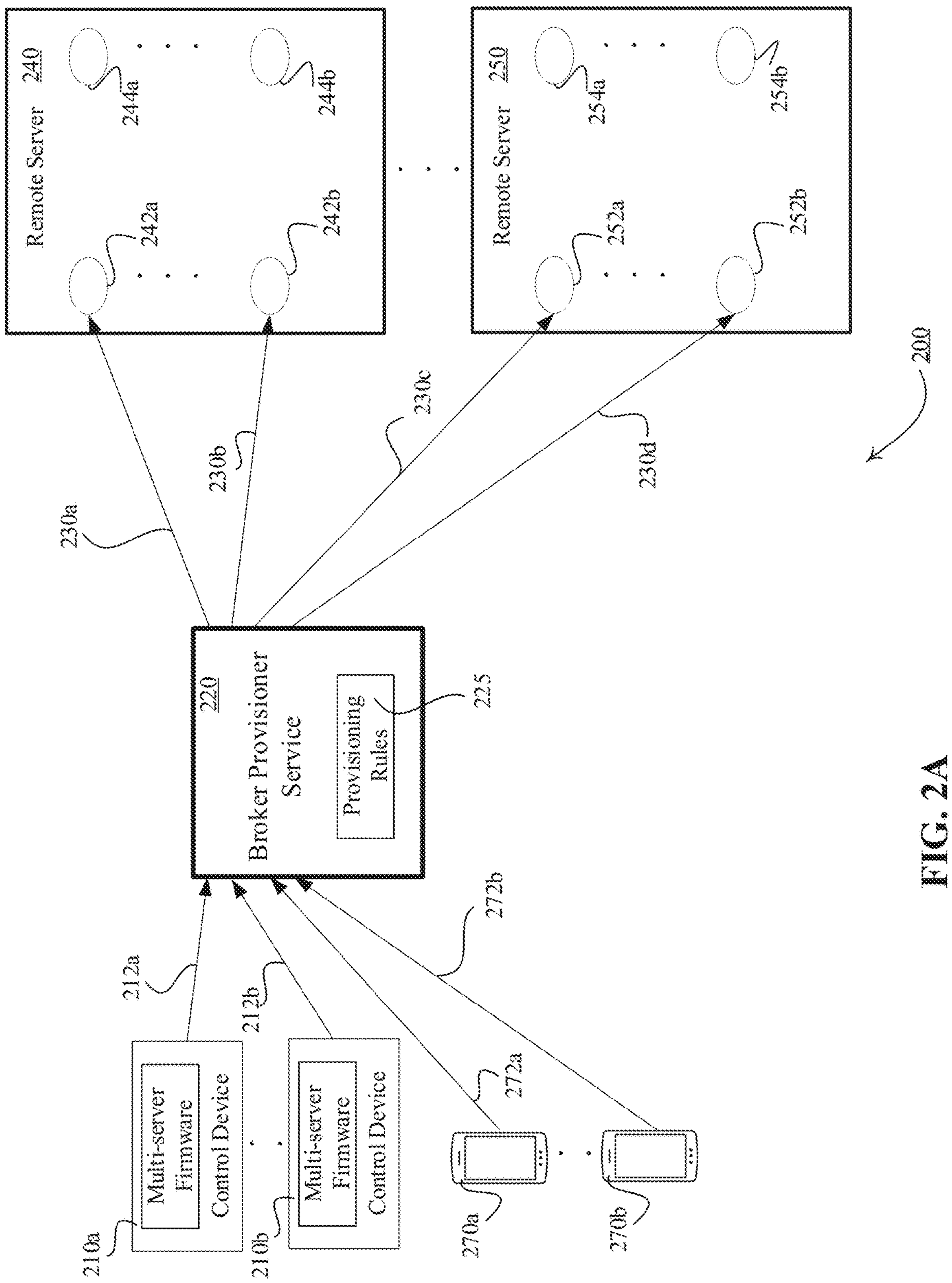
FIGS. 2A and 2B are system diagrams that illustrate systems for communicating with and controlling a load control system using messaging-based interfaces.
Figure 2B:
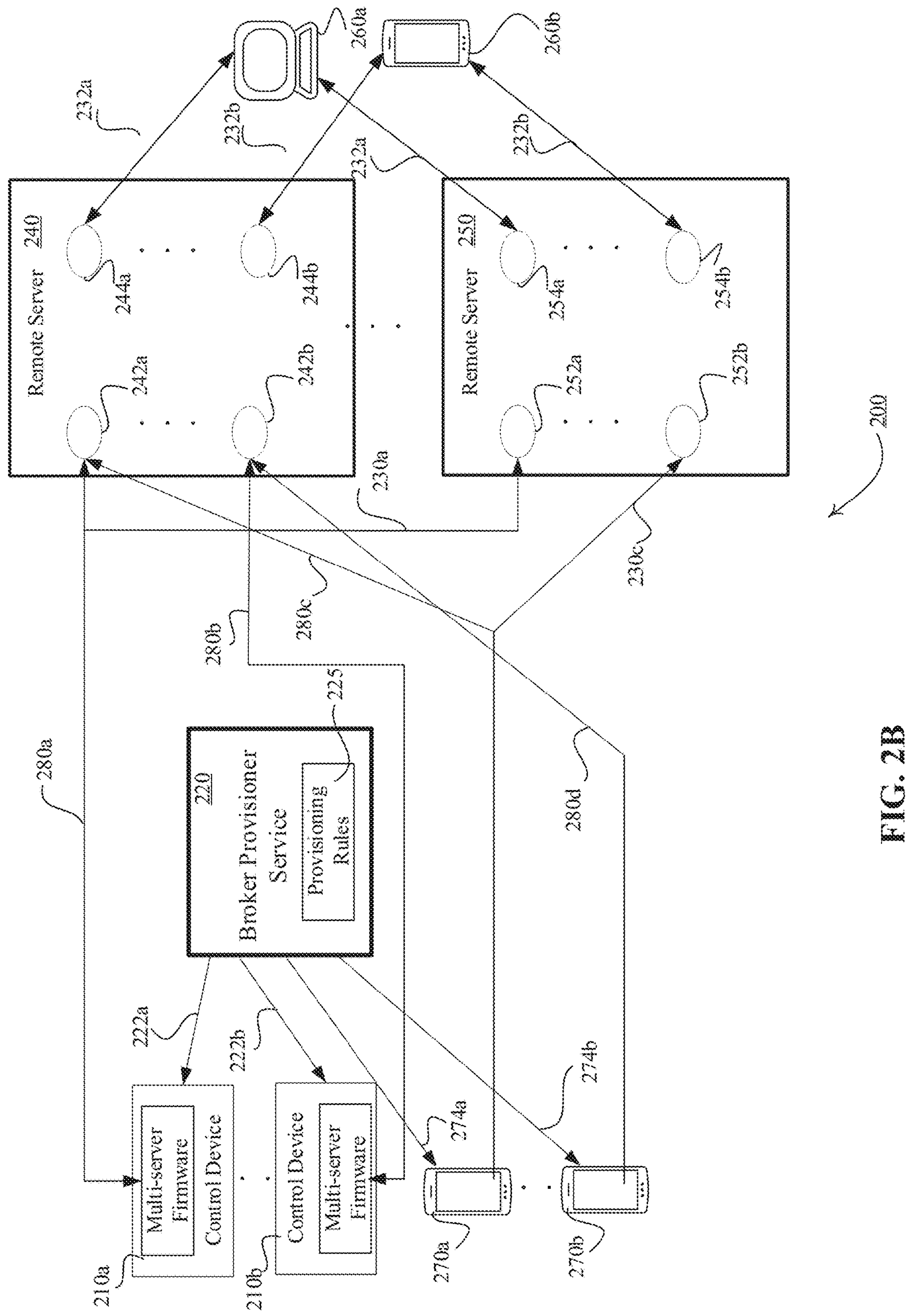

FIGS. 2A and 2B illustrate two possible embodiments of an example system 200. The system 200 may include one or more control devices 210*a*, 210*b*. The system 200 may include a broker service, such as a BPS 220. The system 200 may include one or more user devices, such as mobile devices 270*a*, 270*b*. For description purposes, the mobile devices 270*a*, 270*b* may be used herein to describe user devices. The system 200 may include one or more remote servers 240, 250. Each remote server 240, 250 may include one or more brokers 242*a*, 242*b*, 244*a*, 244*b*, 252*a*, 252*b*,

254*a*, 254*b*. For example, brokers 242*a*, 242*b*, 244*a*, 244*b*, 252*a*, 252*b*, 254*a*, 254*b* may be Internet of things (IoT) brokers. The system 200 may include third-party devices, such as mobile devices or network devices 260*a*, 260*b*, connected to one or more brokers 244*a*, 244*b*, 254*a*, 254*b*, associated with the remote servers 240, 250. The communication in the system 200 shown in FIGS. 2A and 2B may use a message queuing telemetry transport (MQTT) interface. The MQTT interface described herein is provided as an example; however, other messaging-based interfaces may be used.

The brokers (e.g., IoT brokers) described herein may publish and/or subscribe broker services. The brokers may coordinate messages between one or more devices (e.g., control devices and/or mobile devices) and one or more services offered at the remote servers, and/or between devices (e.g., control devices and/or mobile devices). The brokers may be running (e.g., constantly running).

The control devices 210*a*, 210*b* may include a system controller, a control-source device, a control-target device, and/or the like (e.g., as described above). In order to access one or more remote services (e.g., to connect to a remote server, such as remote server 240 or 250), the devices (e.g., such as the control devices 210*a*, 210*b* and/or the mobile devices 270*a*, 270*b*) may connect to a broker service, such as the BPS 220. For example, the control devices 210*a*, 210*b* and/or the mobile devices 270*a*, 270*b* may connect to the BPS 220 by sending a connection request message 212*a*, 212*b*, 272*a*, 272*b*. As discussed below, the connection request message 212*a*, 212*b*, 272*a*, 272*b* may include information about the device which is to be provisioned with a set of remote servers via the BPS 220 and to communicate with the remote servers (e.g., after the BPS 220 provisions the set of remote servers).

The BPS 220 may perform provisioning procedures on behalf of other devices to provision (e.g., regulate) how the devices interface with the services offered by the remote servers 240, 250. The BPS 220 may provision the control device 210*a* to the remote servers 240, 250 so that the control device 210*a* may communicate with (e.g., subscribe to) the services offered by the remote servers 240, 250 via brokers 242*a*, 252*a*. The BPS 220 may provision the control device 210*b* to the remote server 240 so that the control device 210*b* may communicate with (e.g., subscribe to) the service offered by the remote server 240 via broker 242*b*. Although not shown in FIG. 2B, the control devices 210*a*, 210*b* may be provisioned with the remote servers 240, 250 and may communicate with the services offered by the remote servers 240, 250 via one or more of the brokers 242*a*, 242*b*, 252*a*, 252*b*. The control devices 210*a*, 210*b* may use the brokers 242*a*, 242*b*, 252*a*, 252*b* to receive published information from or to publish information to the remote servers 240, 250. The control device 210*a*, 210*b* may access information available at the brokers 242*a*, 242*b*, 252*a*, 252*b*, located at a part of a different cloud service offered by different remote servers 240, 250, based on the provisioning procedures performed by the BPS 220. For example, the control device 210*a* may use the brokers (e.g., the broker 242*a*) on the remote server 240 to receive information that a user of a mobile device (e.g., device 270*a*) published a control message to turn off a light that the control device 210*a* controls. The control device 210*b* may publish load control messages to the services on the remote server 250 (e.g., although not shown in the example of FIG. 2B, the control device 210*b* may be connected with the remote server 250 and/or the broker 252*b*). The published load control messages from the control device 210*b* to the services on the remote server 250 (e.g., via the broker 252*b*) may be sent to the mobile device 270*a*.

The BPS 220 may be globally and/or locally available. For example, the BPS 220 may be available globally so that the devices may be provisioned with locally available remote servers and/or following local government regulations, as discussed below. The BPS 220 may be available locally and the BPS may provision the devices with locally available remote servers and/or follow local regulations. The BPS 220 may provision a set of cloud services associated with remote servers to the subscribing devices. The BPS 220 may be web-based. The BPS 220 may be a portion of a suite of a system and/or software.

The BPS 220 may have information on the control devices 210*a*, 210*b* and/or the mobile devices 270*a*, 270*b* and information about the services offered by the remote servers 240, 250. For example, the BPS 220 may have information about different topics for receiving different information or access to different services on the remote servers 240, 250. The BPS 220 may provision different services on the remote server 240 and/or the remote server 250 based on defined provisioning rules 225 stored thereon. The provisioning rules 225 may define which remote servers the BPS 220 makes available for the control devices 210*a*, 210*b* and/or the mobile devices 270*a*, 270*b* to connect with, e.g., based on the information provided in the respective connection requests 212*a*, 212*b*, 272*a*, 272*b*. Based on the provisioning rules 225, the BPS 220 may provide information to the control devices 210*a*, 210*b*, and/or the mobile devices 270*a*, 270*b* to subscribe to different topics for receiving different information, and/or to allow access to different services on the remote servers 240, 250.

The BPS 220 may receive information from the remote servers indicating one or more services available at the remote servers. The BPS 220 may have information of available services and the corresponding remote servers for the devices (e.g., control devices 210*a*, 210*b* and/or the mobile device 270*a*, 270*b*) to be provisioned with.

The provisioning rules 225 may configure the BPS 220 to send connection establishment messages to the remote servers 240, 250 on behalf of the control devices 210*a*, 210*b* and/or the mobile devices 270*a*, 270*b*. The provisioning rules 225 may be configured based on the information about the control devices 210*a*, 210*b* and/or the mobile devices 270*a*, 270*b*. For example, the provisioning rules 225 may configure the BPS 220 to send connection establishment messages based on the connection request messages 212*a*, 212*b*, 272*a*, 272*b* from the corresponding control devices 210*a*, 210*b* and/or the mobile devices 270*a*, 270*b* requesting to be provisioned by the BPS 220. For example, each of the connection request messages 212*a*, 212*b*, 272*a*, 272*b* from the corresponding control devices 210*a*, 210*b* and/or the mobile devices 270*a*, 270*b* may include control device IDs, control device types, serial numbers, MAC addresses, universal identifiers, authorization information, location information, etc. That is, each connection request message 212*a*, 212*b*, 272*a*, 272*b* may include information such as where the devices are located (e.g., initiating the connection request), which devices are requesting the provisioning, whether the mobile devices have authority to use/control the associated devices, such as the load control devices, etc. Based on the information included in the connection request messages 212*a*, 212*b*, 272*a*, 272*b*, the BPS 220 may have information about which control devices 210*a*, 210*b* and/or which mobile devices 270*a*, 270*b* are requesting connection with the services, where the control devices are requesting the connection from, and/or whether the control devices have authorizations. Based on the information of the control devices 210*a*, 210*b* and/or the mobile devices 270*a*, 270*b*, the provisioning rules 225 configure the BPS 220 to send connection establishment messages 230*a*-230*d* to the appropriate remote servers 240, 250 (e.g., that are each available for the control devices 210*a*, 210*b* and/or the mobile devices 270*a*, 270*b*).

The remote servers 240, 250 offering services to the control devices 210*a*, 210*b* and/or the mobile devices 270*a*, 270*b* may be online platform service providers. The services that the remote servers 240, 250 provide may be cloud services. The remote servers 240, 250 may be commercially available online platform services that provide cloud services. Each remote server 240, 250 may offer different cloud services. Each remote server 240, 250 may offer overlapping cloud services between the remote servers 240, 250. Each remote server 240, 250 may offer different connection speeds. Each remote server 240, 250 may have different storage capacity. Each remote server 240, 250 may have different pricing plans based on the connection speeds, storage capacities, etc. For example, the remote server 240 may have a higher pricing plan, but a faster connection speed than the remote server 250.

Based on information about the control devices 210*a*, 210*b* and/or the mobile devices 270*a*, 270*b*, information about the remote servers 240, 250, and/or the provisioning rules 225, the BPS 220 may determine which corresponding services on the remote servers 240, 250 to provision the devices with. The BPS 220 may provide connection or provisioning information to the devices, such as the control devices 210*a*, 210*b* and/or the mobile devices 270*a*, 270*b* (e.g., via provision messages 222*a*, 222*b*, 274*a*, 274*b* shown in FIG. 2B and discussed below). Based on the provisioning information from the BPS 220, the control devices 210*a*, 210*b* and/or the mobile devices 270*a*, 270*b* may establish connections with the remote servers 240, 250. For example, the provision information from the BPS 220 may include instructions (e.g., protocols, addresses, ports, communication channels, etc.), credential information (e.g., certificates, usernames, passwords, etc.), and/or the like. The control devices 210*a*, 210*b* and/or the mobile devices 270*a*, 270*b* may use the provision information to try and establish connections with the provisioned remote servers (e.g., and the services offered by the provisioned remote servers). The control devices 210*a*, 210*b* may each execute multi-server firmware and try to and establish communication channels with the provisioned services offered by the remote servers 240, 250. As discussed below, the multi-server firmware residing on the control devices 210*a*, 210*b* may determine a subset of the set of provisioned remote services from the BPS 220 and may have parallel connections with multiple services offered by the remote servers 240, 250. For example, the multi-server firmware may determine to communicate with one or more of (e.g., each) the provisioned remote servers, either one of the provisioned remote servers, or a compound set of provisioned remote servers. The control devices 210*a*, 210*b* may have parallel connections with multiple services offered between the remote servers 240, 250 (e.g., one or more services offered by the same remote server or offered by different remote servers).

The multi-server firmware may configure the control devices 210*a*, 210*b* to send and/or receive data from one or more brokers associated with provisioned remote servers, e.g., at the same time. For example, the sent and/or received data may be the same for each of the provisioned brokers. For example, the sent and/or received data may be different from each of the provisioned brokers. The multi-server firmware may establish alternative connections with one or more other provisioned brokers and/or other provisioned remote servers if any problem arises during the communication and/or at the initial connection setup. For example, if the control device 210*a* is provisioned with broker services 242*a*, 252*a* in the corresponding remote servers 240, 250, then the control device 210*a*, via the multi-server firmware, may connect to the broker 242*a* associated with the remote server 240. If the multi-server firmware detects any problems with the remote server 240 and/or the broker 242*a*, the multi-server firmware may connect with the other provisioned broker 252*a* associated with the remote server 250, as an alternative. The multi-server firmware may periodically check with other brokers and determine if the problem has been resolved with the previous remote server and/or the broker (e.g., the broker 242*a* and/or the remote service 240). If the problem has been resolved, the multi-server firmware may connect with the previous remote server and/or the broker (e.g., the broker 242*a* and/or the remote service 240) or stay connected with the current remote server and/or the broker (e.g., the broker 252*a* and/or the remote service 250).

The control devices 210*a*, 210*b* and/or the mobile devices 270*a*, 270*b* may each send a connection request message 212*a*, 212*b*, 272*a*, 272*b* to the BPS 220. The devices may include information about the devices in the connection request messages 212*a*, 212*b*, 272*a*, 272*b*. For example, the control devices 210*a*, 210*b* and/or the mobile devices 270*a*, 270*b* may include device IDs, device types, serial numbers, MAC addresses, universal identifiers, authorization information, location information, etc. The devices may each send information that may identify which devices are requesting provisioning and the location information of the device that is initiating the requests to the BPS 220.

As described herein, the devices (e.g., control devices 210*a*, 210*b* and/or the mobile devices 270*a*, 270*b*) may connect to the BPS 220. For example, the devices may connect to the BPS 220 during initial power on of the devices (e.g., when the control devices 210*a*, 210*b* and/or the mobile devices 270*a*, 270*b* power on for the first time), when the devices go through a power cycle, and/or periodically, e.g., after a preconfigured time lapse. The devices may each connect to the BPS 220 when the devices are powered on. For example, the control devices 210*a*, 210*b* and/or the mobile devices 270*a*, 270*b* may each automatically connect to the BPS 220 when the control devices 210*a*, 210*b* and/or the mobile devices 270*a*, 270*b* first power on. The devices may connect to the BPS 220 after a power cycle. For example, the control devices 210*a*, 210*b* and/or the mobile devices 270*a*, 270*b* may automatically connect to the BPS 220 when the control devices 210*a*, 210*b* and/or the mobile devices 270*a*, 270*b* are each restarted (e.g., unplugged and re-plugged). The devices may have previously stored connection information with one or more brokers 242*a*, 242*b*, 252*a*, 252*b* associated with remote servers 240, 250 that are previously provisioned. For example, the control devices 210*a*, 210*b* and/or the mobile devices 270*a*, 270*b* may have the previously stored connection information that was provisioned by the BPS 220 with one or more brokers 242*a*, 242*b*, 252*a*, 252*b* in a cached memory. The devices may receive updated provisioning information about one or more brokers 242*a*, 242*b*, 252*a*, 252*b* by connecting (e.g., reconnecting) to the BPS 220. The devices may each connect to the BPS 220 periodically, e.g., after a preconfigured period of time. Similar to the connections of the devices to the BPS 220 after a power cycle, the devices may each automatically connect to the BPS 220 after a preconfigured period of time and may receive updated provisioning information about the brokers 242*a*, 242*b*, 252*a*, 252*b*, if any, from the BPS 220.

When the devices (e.g., the control devices 210*a*, 210*b* and/or the mobile devices 270*a*, 270*b*) connect to the BPS 220, the devices may each send a connection request message 212*a*, 212*b*, 272*a*, 272*b* for requesting connection to one or more services offered by one or more of the remote servers 240*a*, 240*b*. The devices may also send information about the devices as described herein when connecting with the BPS 220. As described above, the devices may each include information about the devices (e.g., such as device IDs, device types, serial numbers, MAC addresses, universal identifiers, authorization information, location information, and/or the like).

The BPS 220 may perform a provisioning procedure to establish how the devices (e.g., control devices 210*a*, 210*b* and/or the mobile devices 270*a*, 270*b*) interface with the services offered by the remote servers 240, 250. Each remote server 240, 250 may allow the control devices 210*a*, 210*b* and/or the mobile devices 270*a*, 270*b* to subscribe to different topics for receiving different information or access to different services. The BPS 220 may provision different services on the remote server 240 and/or the remote server 250 based on defined provisioning rules 225 stored thereon. As described above, the provisioning rules 225 may apply logical rules or algorithms to provision the devices with the services offered by the remote servers 240, 250 based on the information on the devices and information about the remote servers 240, 250. Based on the provisioning rules 225, the BPS 220 may send connection request messages 230*a*-230*d* to the remote servers 240, 250. The connection request messages 230*a*-230*d* sent to the remote servers 240, 250 may include information that one or more devices may establish connection with the remote servers (e.g., after the devices are provisioned with a set of remote servers by the BPS server). As such, the remote servers 240, 250 may expect connection requests from the devices included (e.g., identified) in the connection request messages 230*a*-230*d*.

In response to the connection request messages 212*a*, 212*b*, 272*a*, 272*b*, the BPS 220 may determine and/or select one or more brokers 242*a*, 242*b*, 252*a*, 252*b* associated with the corresponding remote servers 240, 250 based on the information about the devices (e.g., the control device 210*a*, 210*b* and/or the mobile devices 270*a*, 270*b*). The BPS 220 may use one or more types of information about the devices to determine one or more brokers 242*a*, 242*b*, 252*a*, 252*b* for which each of the devices are to be provisioned for accessing information and/or the services from one or more of the remote servers 240, 250. For example, the BPS 220 may identify one or more brokers 242*a*, 242*b*, 252*a*, 252*b* for provisioning based on topics to which the control devices 210*a*, 210*b* and/or the mobile devices 270*a*, 270*b* should subscribe to access information and/or services (e.g., based on the provisioning rules 225). For example, the BPS 220 may identify the remote servers 240, 250 that are closest to the control device 210*a*, 210*b* and/or the mobile devices 270*a*, 270*b* based on the location information. The BPS 220 may provision the control devices 210*a*, 210*b* and/or the mobile devices 270*a*, 270*b* to connect with one or more remote servers located in the same geographic area as the control devices 210*a*, 210*b* and/or the mobile devices 270*a*, 270*b* to ensure that the one or more remote servers comply with local government regulations. The BPS 220 may determine (e.g., based on the provisioning rules 225) that the control device 210*a* is in a different device class or different device type than the control device 210*b*. Based on the determination, the BPS 220 may determine to provision the control device 210*a* with information to connect to either remote server 240, which may have a premium connection speed, for example, or to remote server 250, which may have a lower connection speed, for example, while the control device 210*b* may be allowed to connect to remote server 250, based on the provisioning rules 225 for device class, device type, etc. After the BPS 220 determines which of the one or more brokers a respective control device or mobile device should connect to, the BPS 220 may send connection establishment messages 230*a*-230*d* to the appropriate brokers 242*a*, 242*b*, 252*a*, 252*b* associated with the remote servers 240, 250.

The BPS 220 may provision different services on the remote server 240 and/or the remote server 250 based on defined provisioning rules 225 stored thereon. The provisioning rules 225 may configure the BPS 220 to send connection establishment messages to the remote servers 240, 250 on behalf of the devices (e.g., the control devices 210*a*, 210*b* and/or the mobile devices 270*a*, 270*b*). The provisioning rules 225 may be configured based on information about the control devices 210*a*, 210*b* and/or the mobile devices 270*a*, 270*b*. For example, the provisioning rules 225 may configure the BPS 220 to send connection establishment messages based on the control devices 210*a*, 210*b* and/or the mobile devices 270*a*, 270*b* requesting connections with the services on the remote server 240, 250. The BPS 220 may know which devices are requesting the connection with the services and where the devices are initiating the connection from based on the device IDs, device types, serial numbers, MAC addresses, universal identifiers, authorization information, location information, and/or the like that the devices 210*a*, 210*b*, 270*a*, 270*b* provide. Based on the information of the control devices 210*a*, 210*b* and/or the mobile devices 270*a*, 270*b*, the provisioning rules 225 configure the BPS 220 to send connection establishment messages to the available remote servers 240, 250 with which the control devices 210*a*, 210*b* and/or the mobile devices 270*a*, 270*b* may establish communication.

Based on the connection establishment request messages 230*a*-230*d* from the BPS 220, each remote server 240, 250 may allow the control devices 210*a*, 210*b*, and/or the mobile devices 270*a*, 270*b* to subscribe to different topics for receiving different information or to access different services. That is, the remote servers 240, 250 may expect connection requests from the control devices 210*a*, 210*b*, and/or the mobile devices 270*a*, 270*b*. If the remote servers 240, 250 receive connection requests from the identified control devices 210*a*, 210*b*, and/or the mobile devices 270*a*, 270*b* (e.g., identified from the establishment request messages 230*a*-230*d*), the remote servers 240, 250 may allow the devices to communicate with the provisioned services. If the remote servers 240, 250 receive connection requests from unidentified devices (e.g., due to error in or malfunction of the connection request from the devices), the remote servers 240, 250 may block the connection requests from the unidentified device. That is, the remote servers 240, 250 may allow communications from the provisioned devices that are indicated by the connection establishment request messages 230*a*-230*d* from the BPS 220.

As shown in FIG. 2B, the BPS 220 may send provision messages 222*a*, 222*b*, 274*a*, 274*b* to each device 210*a*, 210*b*, 270*a*, 270*b* in response to their respective connection request message 212*a*, 212*b*, 272*a*, 272*b*. The provision messages 222*a*, 222*b*, 274*a*, 274*b* may include a set of remote servers 240, 250 (e.g., and the brokers 242*a*, 242*b*, 252*a*, 252*b* associated with the remote servers 240, 250) that have been provisioned by the BPS 220 to the control devices 210*a*, 210*b* and/or to the mobile devices 270*a*, 270*b*. The provision messages 222*a*, 222*b*, 274*a*, 274*b* may include information that the control devices 210*a*, 210*b* and/or the mobile devices 270*a*, 270*b* may use to establish connections with the provisioned remote servers 240, 250 and/or associated brokers 242*a*, 242*b*, 252*a*, 252*b*.

The provision messages 222*a*, 222*b*, 274*a*, 274*b* may include information on how the BPS 220 provisions the control devices 210*a*, 210*b* and/or the mobile devices 270*a*, 270*b* with the remote server 240, 250 (e.g., based on the provisioning rules 225). The provisioning rules 225 may configure the BPS 220 to include connection information on the provision messages 222*a*, 222*b*, 274*a*, 274*b* to the devices. The BPS 220 may determine to provision the control devices 210*a*, 210*b* and/or the mobile device 270*a*, 270*b* to a set of remote servers 240, 250 and inform the devices to communicate with one or more (e.g., each) brokers 242*a*, 242*b*, 252*a*, 252*b* associated with one or more (e.g., each) remote servers 240, 250 (e.g., on the provision messages 222*a*, 222*b*, 274*a*, 274*b*). The BPS 220 may determine to provision the control devices 210*a*, 210*b* and/or the mobile devices 270*a*, 270*b* to a set of remote servers 240, 250 and inform the devices to communicate with either one of the brokers 242*a*, 242*b*, 252*a*, 252*b* associated with either one of the corresponding remote server 240 or the corresponding remote server 250 (e.g., on the provision messages 222*a*, 222*b*, 274*a*, 274*b*). The BPS 220 may determine to provision the control devices 210*a*, 210*b* and/or the mobile devices 270*a*, 270*b* to a set of remote servers 240, 250 and inform the devices to communicate with compound (e.g., a combination of) sets of brokers 242*a*, 242*b*, 252*a*, 252*b* in the remote servers 240, 250 (e.g., on the provision messages 222*a*, 222*b*, 274*a*, 274*b*).

As an example, the BPS 220 may have information that the remote servers 240, 250 are operated by Amazon Web Service (AWS), Xively service, Microsoft service, etc. Based on the information about the control devices 210*a*, 210*b* and/or the mobile devices 270*a*, 270*b*, the BPS 220 may provision the devices with a set of remote servers 240, 250 and associated services (e.g., based on the provisioning rules 225 and the provisioning procedures described herein).

Based on the device information and the provisioning rules 225, the BPS 220 may identify and send the establish connection messages to the remote servers 240, 250 to which the devices may connect (e.g., once provisioned). For example, based on the device types and the locations of the devices, the BPS 220 may identify that the control device 210*a* may establish connections with a broker 1 (e.g., 242*a*) for an AWS 1 remote server (e.g., 240) and a broker 1 (e.g., 252*a*) for a Xively 1 remote server (e.g., 250). The BPS 220 may send connection establishment messages 230*a*, 230*c* to the remote servers 240, 250 provisioning the remote servers 240, 250 for the control device 210*a*. When the BPS 220 sends the provision message 222*a* back to the control device 210*a*, the BPS 220 may provision the control device 210*a* to connect to one or more (e.g., each) of the provisioned remote servers and associated services. That is, the provision message 222*a* may configure the control device 210*a* (e.g., the multi-server firmware to send parallel connections as discussed below) to the broker 1 (e.g., 242*a*) for the AWS 1 remote server (e.g., 240) and the broker 1 (e.g., 252*a*) for the Xively 1 remote server (e.g., 250) via the connection message 280*a*.

Based on the control devices information and the provisioning rules 225, the BPS 220 may identify and send establish connection messages to either one of the remote servers 240, 250 to which the devices may connect (e.g., once provisioned). For example, based on the device types and the locations of the devices, the BPS 220 may identify that the control device 210*b* may establish connections with a broker 2 (e.g., 242*b*) for an AWS 1 remote server (e.g., 240) and a broker 2 (e.g., 252*b*) for a Xively 1 remote server (e.g., 250). The BPS 220 may send connection establishment messages 230*b*, 230*d* to the remote servers 240, 250 provisioning the remote servers 240, 250 for the control device 210*b*. When the BPS 220 sends the provision message 222*b* back to the control device 210*b*, the BPS 220 may provision the control device 210*b* to connect to either one of the provisioned remote servers and associated services. That is, the provision message 222*b* may configure the control device 210*b* to send (e.g., via the multi-server firmware discussed below) communications with either the broker 2 (e.g., 242*b*) for the AWS 1 remote server (e.g., 240) or the broker 2 (e.g., 252*b*) for the Xively 1 remote server (e.g., 250). As shown in FIG. 2B, the control device 210*b* may send connection message 280*b* to the broker 2 (e.g., 242*b*) for the AWS 1 remote server (e.g., 240). As such, the control device 210*b* may not have duplicate connections for the same topic based on the provision message 274*a*. The control device 210*b* may communicate with the broker 2 (e.g., 252*b*) for the Xively 1 remote server (e.g., 250) if the broker 2 (e.g., 242*b*) and/or the AWS 1 remote server (e.g., 240) becomes unavailable. For example, the control device 210*b* may send the connection message 280*b* to the Xively 1 remote server (e.g., 250) and try to establish connection with the broker 2 (e.g., 252*b*), as an alternative server and/or broker, if the control device 210*b* recognizes an issue with the previously connected AWS 1 remote server (e.g., 240) and/or the broker 2 (e.g., 242*b*) or during the connection with the AWS 1 remote server (e.g., 240) and/or the broker 2 (e.g., 242*b*). That is, the control device 210*b* may stay connected with one or more alternative remote servers if one or more remote servers and/or brokers become unavailable.

Based on the device information and the provisioning rules 225, the BPS 220 may identify and send the establish connection messages to the remote servers 240, 250 to which the devices may connect (e.g., once provisioned). For example, based on the device types and the locations of the devices, the BPS 220 may identify that the mobile device 270*a* may establish connections with a broker 1 (e.g., 242*a*) or a broker 2 (e.g., 242*b*) for an AWS 1 remote server (e.g., 240) and a broker 2 (e.g., 252*b*) for a Xively 1 remote server (e.g., 250). The BPS 220 may send connection establishment messages 230*a*, 230*b*, 230*d* to the remote servers 240, 250 provisioning the remote servers 240, 250 for the mobile device 270*a*. When the BPS 220 sends the provision message 274*a* back to the mobile device 270*a*, the BPS 220 may provision the mobile device 270*a* to connect to either one of the provisioned brokers associated with the first remote server and to connect with the provisioned broker associated with the second remote server. That is, the provision message 274*a* may configure the mobile device 270*a* to send parallel communications with either the broker 1 or the broker 2 (e.g., 242*a* or 242*b*) for the AWS 1 remote server (e.g., 240) and the broker 2 (e.g., 252*b*) for the Xively 1 remote server (e.g., 250). As shown in FIG. 2B, the mobile device 270*a* may send connection message 280*c* to the broker 1 (e.g., 242*a*) for the AWS 1 remote server (e.g., 240) and to the broker 2 (e.g., 252*b*) for the Xively 1 remote server (e.g., 250). The mobile device 270*a* may communicate with the broker 2 (e.g., 242*b*) for the AWS 1 remote server (e.g., 240) if the broker 1 (e.g., 242) becomes unavailable.

As described herein, the provision messages 222_a_, 222_b_, 274_a_, 274_b_ may provide configurations on how the control devices 210_a_, 210_b_ and/or the mobile devices 270_a_, 270_b_ may establish connections with one or more brokers for the remote servers 240, 250. Based on the provisioned messages, the devices may send connection messages 280_a_-280_d_ to the provisioned and configured remote servers and associated brokers.

The control device 210_a_ may send the connection message 280_a_ by executing the multi-server firmware. For example, based on the provision message 222_a_, the control device 210_a_ may be aware that the BPS 220 has provisioned the remote server 240 and the remote server 250 (e.g., and the broker 242_a_ and the broker 252_a_) and should connect to each one of the remote servers 204, 250. The multi-server firmware may send parallel communications to the remote servers 240, 250 and establish connections with the brokers 242_a_, 252_a_. After the control device 210_a_ sends the connection message 280_a_ (e.g., via the multi-server firmware), the control device 210_a_ may subscribe to the broker 242_a_ and the broker 252_a_ and have parallel communications with both. The multi-server firmware may send one or more connection messages to the one or more remote servers and/or the corresponding brokers in the remote servers. The control device 210_a_ may receive information from the broker 242_a_ and/or the broker 252_a_, e.g., via the established communication channels. The control device 210_a_ may also publish information to the broker 242_a_ and/or the broker 252_a_, e.g., via the established communication channels. As discussed below, the broker 242_a_ and/or the broker 252_a_ may send a request message (e.g., via the established communication channels) back to the control device 210_a_ asking for additional information for the remote servers 240, 250. The requested information may be for operation of the remote servers 240, 250.

Similarly, the BPS 220 may send the provision message 222_b_ to the control device 210_b_, indicating that the control device 210_b_ has been provisioned to establish connections with the brokers 242_b_, 252_b_. The provision message 222_b_ may also indicate that the control device 210_b_ may establish a connection with either the broker 242_b_ associated with the remote server 240 or the broker 252_b_ associated with the remote server 250. In response to receiving the provision message 222_b_, the control device 210_b_ may determine (e.g., via the multi-server firmware) with which one of the brokers 242_b_, 252_b_ and/or the remote servers 240, 250 to communicate. The control device 210_b_ may send a connection message 280_b_ to the broker 242_b_ for the remote server 240 (e.g., based on the connection speeds and/or pricing plans of the remote servers as discussed herein). The control device 210_b_ may send the connection message 280_b_ by executing the multi-server firmware. After the control device 210_b_ sends the connection message 280_b_, the control device 210_b_ may receive information from the broker 242_b_ and/or publish information to the broker 242_b_ via the established communication channel between the control device 210_b_ and the remote server 240 via the broker 242_b_. As discussed below, the broker 242_b_ may send a request message (e.g., via the established communication channel) back to the control device 210_b_ asking for additional information for the operation of the remote server 240.

Similarly, the BPS 220 may send the provision message 274_a_ to the mobile device 270_a_, indicating that the mobile device 270_a_ has been provisioned to establish connections with a compound list of brokers 242_a_, 242_b_, 252_b_ and the associated remote servers 240, 250. The provision message 274_a_ may also indicate that the mobile device 270_a_ may establish compound connections with the brokers 242_a_, 242_b_, 252_b_ and the associated remote servers 240, 250 as described herein. In response to receiving the provision message 274_a_, the mobile device 270_a_ may select one of the provisioned brokers 242_a_, 242_b_ on the remote server 240 and may select the provisioned broker 252_b_ on the remote server 250 (e.g., based on the connection speeds and/or pricing plans of the remote servers 240, 250). As shown in FIG. 2B, the mobile device 270_a_ may send connection message 280_c_ to each of the brokers 242_a_, 252_b_ for the remote servers 240, 250. After the mobile device 270_a_ sends the connection message 280_c_, the mobile device 270_a_ may communicate with each of the brokers 242_a_, 252_b_ and/or publish information to each of the brokers 242_a_, 252_b_. The broker 252_b_ may send a request message back to the mobile device 270_a_ asking for additional information/data for the operation of the remote server 250. The broker 242_a_ may skip sending the request message back to the mobile device 270_a_.

Similarly, the BPS 220 may send the provision message 274_b_ to the mobile device 270_b_, indicating that the mobile device 270_b_ has been provisioned to establish connections with the broker 242_b_ associated with the remote server 240. The provision message 274_b_ may include information for the mobile device 270_b_ to connect to one or more (e.g., each) of the provisioned brokers and the corresponding remote servers. In response to receiving the provision message 274_b_, the mobile device 270_b_ may send a connection message 280_d_ to the broker 242_b_ for the remote server 240. After the mobile device 270_b_ sends the connection message 280_d_, the mobile device 270_b_ may communicate with the broker 242_b_ and the remote server 240 by receiving and/or publishing information to/from the broker 242_b_ via the established communication channel. The broker 242_b_ may send a request message back to the mobile device 270_b_ asking for additional data/information for the services for the remote server 240.

The mobile devices 270_a_, 270_b_ may be provisioned with a set of remote servers (e.g., and one or more services offered by the remote servers) via the provision messages 274_a_, 274_b_. Each mobile device 270_a_, 270_b_ may go through the set of remote servers to which the mobile devices 270_a_, 270_b_ may connect. The mobile devices 270_a_, 270_b_ may choose a service/broker provisioned by the BPS (e.g., via priority information received from the provision messages 274_a_, 274_b_) and may stop trying to establish connection if the mobile devices 270_a_, 270_b_ have been successfully connected with the service/broker. For example, the mobile devices 270_a_, 270_b_ may try to establish another connection (e.g., a second connection) with another service/broker from the set of provisioned services by the BPS if the first connection was not successful.

As shown in FIG. 2B, the control device 210_b_ and the mobile device 270_b_ may be provisioned to the same remote server 240 (e.g., via the same services/broker 242_b_ offered by the remote server 240 and paired by the BPS). The control device 210_b_ may receive a control message from the mobile device 270_b_ (e.g., a user pressing a button to turn off the light that the control device 210_b_ controls). For example, the mobile device 270_b_ may publish the control message via the established communication tunnel to the broker 242_b_. The control device 210_b_ may receive the control message from the mobile device 270_b_ by receiving the published information from the broker 242_b_ via the established communication tunnel. The user may turn on the light that the control device 210_b_ controls and the control device 210_b_ may publish the control message information to the broker

242*b*. The mobile device 270*b* may receive the published information from the broker 242*b* via the established communication tunnel. As described herein, the mobile device 270*b* may receive the control message information from the control device 210*b* (e.g., directly or locally based on the BPS provisioning the mobile device 270*b* with the control device 210*b*).

The remote servers 240, 250 may be online platforms offering services, such as cloud services. The remote servers 240, 250 may be commercially-available cloud service providers. The remote servers 240, 250 may be web servers. The remote servers 240, 250 may be used by the control devices 210*a*, 210*b* and/or the mobile devices 270*a*, 270*b* to establish connections via the BPS 220 provisioning the brokers 242*a*, 242*b*, 252*a*, 252*b*. The control devices 210*a*, 210*b* and/or the mobile devices 270*a*, 270*b* may communicate with the brokers 242*a*, 242*b*, 252*a*, 252*b* to receive published information from and/or to publish information to the brokers 242*a*, 242*b*, 252*a*, 252*b*.

The remote servers 240, 250 may offer services via the brokers 242*a*, 242*b*, 252*a*, 252*b*. Each broker 242*a*, 242*b*, 252*a*, 252*b* may be associated with a topic with which the control devices 210*a*, 210*b* and/or the mobile devices 270*a*, 270*b* may establish connections (e.g., via the provisions done by the BPS 220) and receive/publish information. When the remote servers 240, 250 receive the connection request messages 230*a*-230*d* from the BPS 220, the remote servers 240, 250 may be aware that the control devices 210*a*, 210*b* and/or the mobile devices 270*a*, 270*b* may establish connections with one or more of their brokers 242*a*, 242*b*, 252*a*, 252*b* for corresponding topics. As described above, the control devices 210*a*, 210*b* and/or the mobile devices 270*a*, 270*b* may receive the provision messages 222*a*, 222*b*, 274*a*, 274*b* from the BPS 220 and may send the connection messages 280*a*-280*d*. For example, the control devices 210*a*, 210*b* may send the connection messages 280*a*, 280*b* via the multi-server firmware. As discussed below, the remote servers 240, 250 may send data request messages to the control devices 210*a*, 210*b* and/or the mobile devices 270*a*, 270*b* in response to the connection messages 280*a*-280*d*, requesting additional information. The control devices 210*a*, 210*b* and/or the mobile devices 270*a*, 270*b* may send the requested data/information to the corresponding brokers 242*a*, 242*b*, 252*a*, 252*b*.

Each remote server 240, 250 may offer the same, or different, list of cloud services. The remote servers 240, 250 may belong to different service providers. For example, the remote server 240 may belong to an AWS. The remote server 250 may belong to a Xively service. Each remote server 240, 250 may offer cloud services for Amazon, Xively, and cloud services for devices. The BPS 220 may provision the control devices 210*a*, 210*b* and/or the mobile devices 270*a*, 270*b* to the same services offered by the remote servers 240, 250. The BPS 220 may provision the devices to the same services and overlapped by the remote servers 240, 250 to ensure data communication between the devices and the remote servers. For example, the Xively service may provide services to the remote server 250 and the AWS may provide services to the remote server 240. The remote server 250 may go offline or may not provide services to the devices. Instead of the devices losing communication with the remote server 250 (and users not being able to control the devices), the BPS 220 may provision the devices to establish connections with two or more servers offering the same services to allow the devices to maintain communication with a portion of the services provided by the remote servers, such that the users may be unaffected by one of the remote servers becoming unavailable.

If the remote servers 240, 250 offer the same cloud services, the BPS 220 may provision the control devices 210*a*, 210*b* and/or the mobile devices 270*a*, 270*b* to establish connections with either one of the remote servers 240, 250. For example, based on the information about the devices and the provisioning rules 225 of the BPS 220, the BPS 220 may prioritize the connections and may provision the devices to establish connections with one of the remote servers (e.g., the remote server 240) that may provide faster connection, or a cheaper service. The prioritization may be different for different types of devices, different systems, or different policies preferred by the users of different systems.

The remote servers 240, 250 may have some overlapping cloud services, but the remote servers 240, 250 may offer different (e.g., non-overlapping) cloud services. The BPS 220 may provision the control devices 210*a*, 210*b* and/or the mobile devices 270*a*, 270*b* to the services offered by the different remote servers. The control devices 210*a*, 210*b* may establish parallel connections with different remote servers 240, 250 at the same time via the multi-server firmware as described herein.

For example, the BPS 220 may provision the control device 210*a* (e.g., via the provision message 222*a*) to establish communication with the broker 242*a* offered by the remote server 240 and the broker 252*a* offered by the remote server 250. In response to receiving the provision message 222*a* from the BPS 220, the control device 210*a* may execute the multi-server firmware and may send parallel connection messages 280*a* to both brokers 242*a* and 252*a* belonging to the two different remote servers 240, 250. The ability for the control devices 210*a*, 210*b* to establish parallel connections with brokers of different cloud services may allow the control devices 210*a*, 210*b* to take advantage of upgraded services offered by one cloud service, while also maintaining services previously established by another cloud service. For example, the multi-server firmware may send and/or receive data to the brokers in different remote servers. The multi-server firmware may send and/or receive the same data to the brokers in different remote servers. The multi-server firmware may send and/or receive different data to the brokers in different remote servers. The multi-server firmware may send and/or receive a portion of data to one broker in a remote server and send and/or receive a portion of data from another broker in a different remote server. The multi-server firmware may choose to send and/or receive data from a broker from one cloud service and may switch to a broker from a different cloud service (e.g., when a problem is detected with the first broker and/or the first cloud service and/or when the first broker and/or the first cloud service connection is congested).

The third-party network devices, the third-party mobile devices, and/or the third-party remote servers 260*a*, 260*b* may subscribe to the remote servers 240, 250 (e.g., via one or more brokers 244*a*, 244*b*, 254*a*, 254*b*) and may utilize the data that was published by the control devices 210*a*, 210*b* and/or the mobile device 270*a*, 270*b*. For example, the third-party remote servers may use the information to know the status of the devices. Based on the published information of the devices at the remote servers 240, 250, the third-party remote servers may know the states of the devices, e.g., whether the devices are turned on, off, etc. (e.g., indicating whether corresponding loads are on, off, etc.). For example, third-party remote servers may host system dashboards. The system dashboards may display the load status for one or more (e.g., various) loads in a load control system based on the published information about the states of the devices. The system dashboards may also send information to the devices.

Figure 3A:
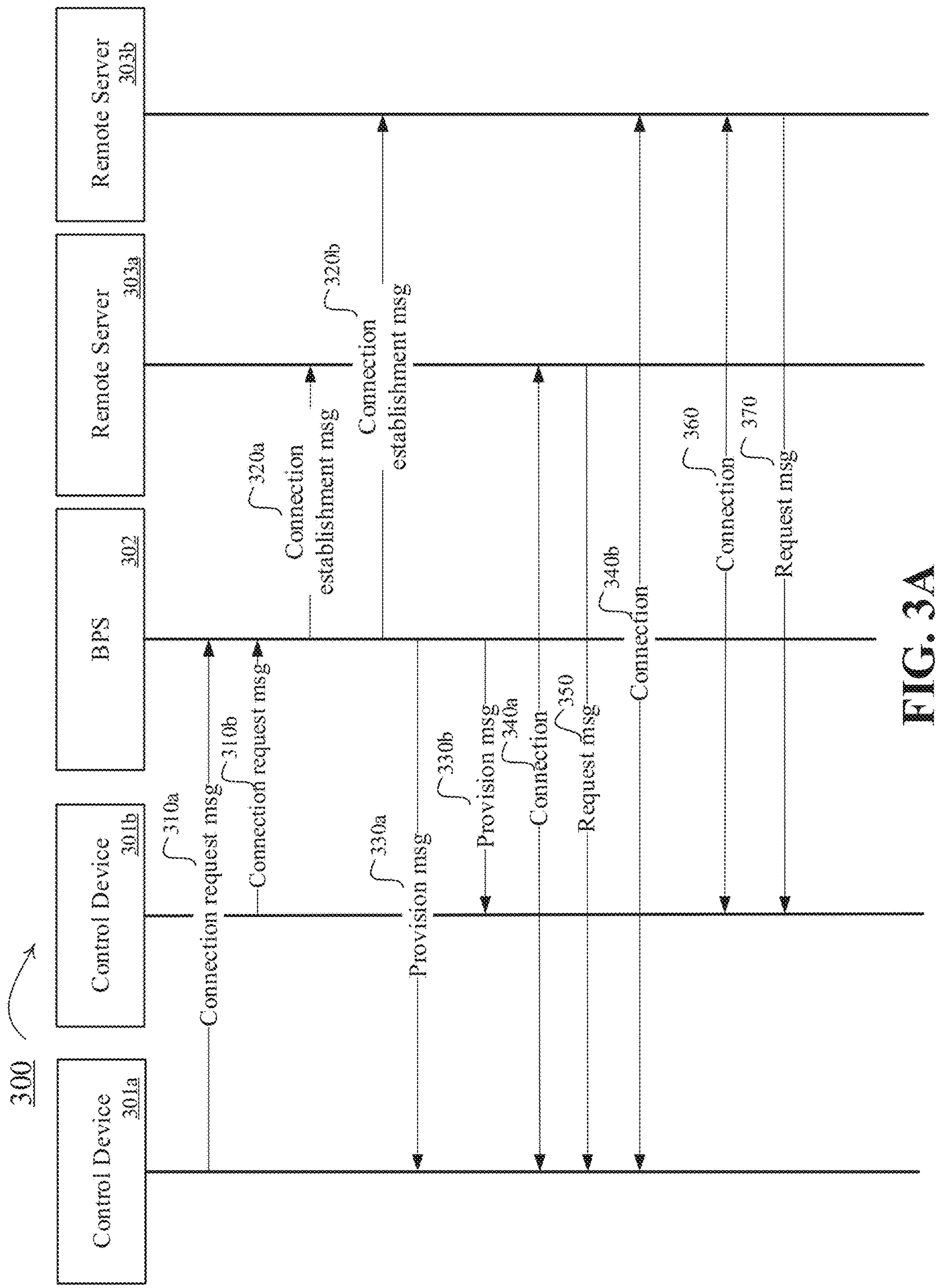
FIG. 3A is a system diagram that illustrates a system for communicating between control devices, a broker provisioner service (BPS), and/or remote servers using messaging-based interfaces.

FIG. 3A illustrates an example system 300 diagram of messaging-based interface communications between control devices 301*a*, 301*b* and one or more brokers associated with remote servers 303*a*, 303*b* via a BPS 302. By way of example, the message-based interface may be an MQTT interface. However, the system 300 message-based interface is not limited to the MQTT interface, and other message-based interfaces may be employed as desired.

The control devices 301*a*, 301*b* may connect to the BPS 302, e.g., when the control devices 301*a*, 301*b* first power on. The control devices 301*a*, 301*b* may connect to the BPS 302 after a power cycle and/or periodically (e.g., after a preconfigured time period). The control devices 301*a*, 301*b* may reconnect with the BPS 302 to determine whether the BPS 302 has any provision connection updates with one or more remote servers 303*a*, 303*b*. The control devices 301*a*, 301*b* may send connection request messages 310*a*, 310*b* to the BPS 302. The connection request messages 310*a*, 310*b* may include information about the control devices 301*a*, 301*b* that the BPS 302 may use to provision the control devices 301*a*, 301*b* based on provisioning procedures and/or provisioning rules. For example, the control devices 301*a*, 301*b* may include information about control device IDs, control device types, serial numbers, MAC addresses, universal identifiers, authorization information, location information, and/or the like on the connection request messages 310*a*, 310*b*.

The BPS 302 may determine and provision the control devices 301*a*, 301*b* based on the provisioning rules. Based on the determination and the provisioning rules, the BPS 302 may send connection establishment messages 320*a*, 320*b* to one or more of the remote servers 303*a*, 303*b* identifying which control devices 301*a*, 301*b* may be connecting with the brokers associated with the remote servers 303*a*, 303*b*. For example, the BPS 302 may send the connection establishment message 320*a* to the remote server 303*a* and the connection establishment message 320*b* to the remote server 303*b*. The connection establishment messages 320*a*, 320*b* may also define what the control devices 301*a*, 301*b* may or may not do when communicating with the provisioned remote servers 303*a*, 303*b*. For example, the connection establishment messages 320*a*, 320*b* may provide permissions information that determines how the control devices 301*a*, 301*b* may communicate with the one or more provisioned remote servers 303*a*, 303*b*.

As an example, the control device 301*a* may be a lighting control device (e.g., an LED driver) for a lighting fixture and the control device 301*b* may be a system controller (e.g., a hub device, a remote-control device, etc.) for lighting control devices. A user may install the lighting fixture and the system controller in a room. Once the lighting control device and the system controller are powered on, the lighting control device and the system controller may automatically connect to the BPS 302.

The remote servers 303*a*, 303*b* may receive the connection establishment messages 320*a*, 320*b* from the BPS 302. Based on the connection establishment messages 320*a*, 320*b*, the remote servers 303*a*, 303*b* and the services offered by the remote servers 303*a*, 303*b* may be aware that the control devices 301*a*, 301*b* (e.g., the lighting control device and the system controller) may communicate with the remote servers 303*a*, 303*b* and/or the services offered by the remote servers 303*a*, 303*b*. If the remote servers 303*a*, 303*b* receive communications from other than the control devices 301*a*, 301*b* identified in the connection establishment messages 320*a*, 320*b*, the remote servers 303*a*, 303*b* may ignore and/or disallow communication with the unidentified devices.

The BPS 302 may send provision messages 330*a*, 330*b* back to the control devices 301*a*, 301*b*. The provision messages may include information about the remote servers 303*a*, 303*b* that the control devices 301*a*, 301*b* may use when establishing communication with the remote servers 303*a*, 303*b*. For example, the provision messages 330*a*, 330*b* may include information about the services, such as service IDs, broker IDs, topic IDs, subscription credentials, certificates, usernames, passwords, instructions, protocols, addresses, ports, communication channels, etc., for the remote servers 303*a*, 303*b*. The provision messages 330*a*, 330*b* may also indicate connection information. For example, the provision messages 330*a*, 330*b* may indicate to the control devices 301*a*, 301*b* to establish connections with the services by connecting to one or more (e.g., each) provisioned services, by connecting with either one of the provisioned services, and/or by creating compound connections with one or more provisioned services from the remote server 303*a* and one or more provisioned services from the remote server 303*b*.

Based on the provision information, the control devices 301*a*, 301*b* may establish connections 340*a*, 340*b*, 360 with the provisioned remote servers 303*a*, 303*b* (e.g., communication channels). For example, the connections 340*a*, 340*b*, 360 may be established communication channels or communication tunnels on which the devices and the provisioned remote servers may communicate. As described above, the control devices 301*a*, 301*b* may execute multi-server firmware to establish communication channels as described herein. For example, based on the provision information that indicates how the control devices 301*a*, 301*b* should connect to the provisioned services (e.g., via each of the services, via either one of the services, and/or via a compound connection with services), the multi-server firmware may send messages via connections 340*a*, 340*b*, 360 to the provisioned services and the corresponding remote servers 303*a*, 303*b*. The multi-server firmware may send one or more (e.g., multiple and parallel) communications simultaneously, and the control devices 301*a*, 301*b* may communicate with the services associated with the remote servers 303*a*, 303*b* to receive information from and/or to publish information to the services in parallel. For example, as shown in FIG. 3A, the control device 301*a* may have dual connections with the remote servers 303*a*, 303*b* (e.g., connections 340*a*, 340*b*). That is, the multi-server firmware in the control device 301*a* may establish dual connections for the control device 301*a*. The dual connections (e.g., and parallel connections) on multiple services on multiple servers may allow the control device 301*a* to maintain credentials and subscriptions to topics at both locations and to publish information to and receive information from both servers simultaneously (e.g., for reliability, redundancy, and/or geographical distributions).

When the control devices 301*a*, 301*b* communicate with the provisioned remote servers 303*a*, 303*b* (e.g., for the first time), the remote servers 303*a*, 303*b* may send request messages 350, 370 asking the control devices 301*a*, 301*b* for additional information/data. The services on the remote servers 303*a*, 303*b* may use the additional information/data to operate properly. For example, the control device 301*a* may be a system controller device for a lighting control system. The remote server 303*a* may send the request message 350 to the control device 301*a* requesting additional data/information about other devices that the system controller is configured to control. For example, the remote server 303*a* may request information about how many electrical loads are being controlled by the system controller.

Figure 3B:
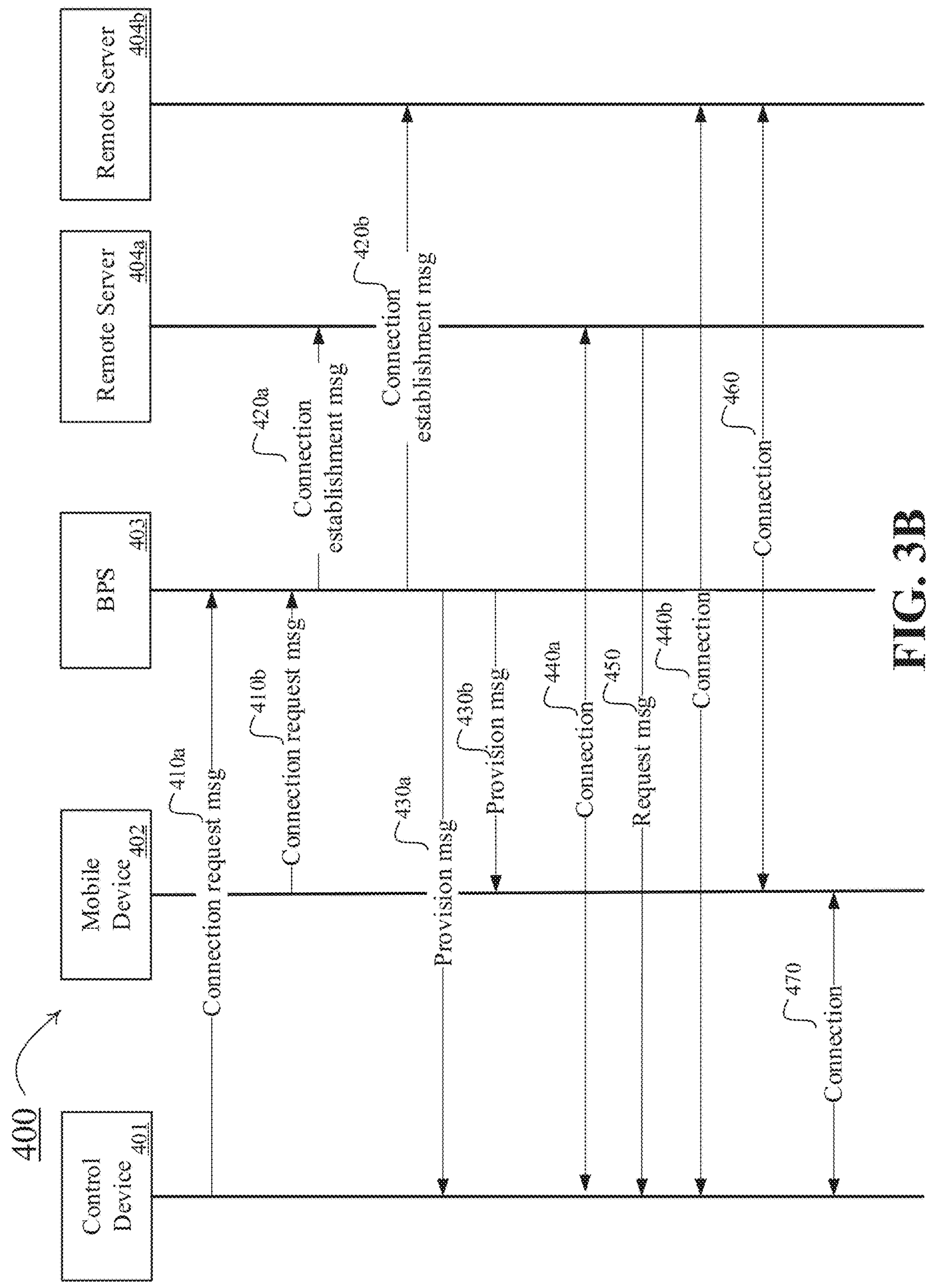
FIG. 3B is a system diagram that illustrates a system for communicating between a control device, a mobile device, a BPS, and/or remote servers using messaging-based interfaces.

FIG. 3B illustrates an example system 400 diagram that illustrates message-based interface communication between a control device 401, a mobile device 402, a BPS 403, and/or remote servers 404*a*, 404*b*. As an example, and not by way of limitation, the message-based interface may be an MQTT interface, and other message-based interfaces may be employed as desired and/or as appropriate.

The control device 401 and the mobile device 402 may connect to the BPS 403. The mobile device 402 may include one or more programs or applications running on the mobile device. The BPS 403 may provision the control device 401 and the mobile device 402 based on the connection request messages 410*a*, 410*b*. The BPS 403 may apply the provisioning rules and may send connection establishment messages 420*a*, 420*b* to the remote servers 404*a*, 404*b*. The BPS 403 may send provision messages 430*a*, 430*b* to the control device 401 and the mobile device 402. The provision messages 430*a*, 430*b* may include provision information about the remote servers 404*a*, 404*b* with which the devices may establish communication. The provision messages 430*a*, 430*b* may include information about the services, such as service IDs, broker IDs, topic IDs, and subscription credentials, for the remote servers 403*a*, 403*b*. The provision messages 430*a*, 430*b* may also indicate connection information. For example, the provision messages 430*a*, 430*b* may indicate to the control device 401 and to the mobile device 402 to establish connection with the services by connecting to one or more (e.g., each) provisioned services, by connecting with either one of the provisioned services, and/or by connecting to a compound set of provisioned services (e.g., connecting to one or more provisioned services from the remote server 403*a* and one or more provisioned services from the remote server 403*b*). The provision message 430*b* may indicate that the control device 401 and the mobile device 402 may establish local access between the two devices. For example, the BPS 403 may provision one or more remote servers to each of the devices. As discussed below, the BPS 403 may also provision the mobile device 402 to the control device 401. For example, the BPS 403 may send an additional set of credentials for the control device 401 and the mobile device 402 to communicate with each other (e.g., directly or locally, once provisioned by the BPS 403). After the control device 401 and the mobile device 402 are provisioned by the BPS 403, the mobile device 402 may communicate (e.g., communicate directly) with the control device 401, or vice versa.

Based on the received provision messages 430*a*, 430*b*, which identify one or more remote servers (e.g., remote servers 404*a*, 404*b*), the control device 401 may communicate with the provisioned remote servers 404*a*, 404*b* directly (e.g., via established communication tunnels, such as connections 440*a*, 440*b*). For example, the control device 401 may execute the multi-server firmware and communicate with the remote servers 440*a*, 440*b*. The multi-server firmware may configure dual connections with the remote servers 404*a*, 404*b* for the control device 401 to have parallel communication with the remote servers 404*a*, 404*b*. The control device 401 may maintain credentials and subscriptions to topics at both locations in the remote servers 404*a*, 404*b* and publish information to and receive information from both servers simultaneously. The mobile device 402 may establish connection 460 (e.g., a communication tunnel) with the remote server 404*b* based on the provision information from the BPS 403. As described above, when the control device 401 and/or the mobile device 402 communicate with the provisioned remote servers 404*a*, 404*b* (e.g., for the first time), the remote servers 404*a*, 404*b* may each send a request message 450 requesting additional information from the devices as described herein.

Based on the connection request message 410*b* from the mobile device 402, the BPS 403 may provision the mobile device 402 to the control device 401. Such provision may allow the mobile device 402 to communicate with the control device 401 (e.g., locally). For example, the mobile device 402 (e.g., functioning as a remote-control device) may include an application to control the control device 401, such as a lighting control device (e.g., an LED driver) for a lighting fixture. The application running on the mobile device 402 may connect with the BPS 403 via the connection request message 410*b*. The connection request message 410*b* may include credentials which indicate (e.g., prove to the BPS 403) that the mobile device 402 has authorization to access the control device 401. Based on the connection request message and included credentials, and/or the provisioning rules, the mobile device 402 may be provisioned via the BPS 403 with the control device 401.

The BPS 403 may also provision the mobile device 402 with the remote server 404*b*. As shown in FIG. 3B, the control device 401 may be provisioned with remote servers 404*a*, 404*b*. That is, the control device 401 and the mobile device 402 may be communicating with the services offered by the remote server 404*b*. A user may turn off the control device 401, such as the lighting control device in the lighting fixture. The control device 401 may publish the control message (e.g., of turning off light) to the remote server 404*b* via the connection 440*b*. The application running on the mobile device 402 may receive published information about the control device 401 from the remote server 404*b* via the connection 460. The user may use the application running on the mobile device 402 to turn on the control device 401, such as the lighting control device in the lighting fixture. The mobile device 402 may publish the control message directly to the control device 401 via the connection 470. The control device 401 may receive the control message and turn on the lighting control device in the lighting fixture. The control device 401 may also publish the control message from the mobile device 402 to the remote server 404*b* via the connection 440*b* (e.g., on behalf of the application running on the mobile device 402). The application running on the mobile device 402 may directly publish the control message controlling the control device 401 to the remote server 404*b*. For example, the application running on the mobile device 402 may publish the control message to both the control device 401 and the remote server 404*b* simultaneously by sending parallel messages via the connections 460, 470.

Figure 4:
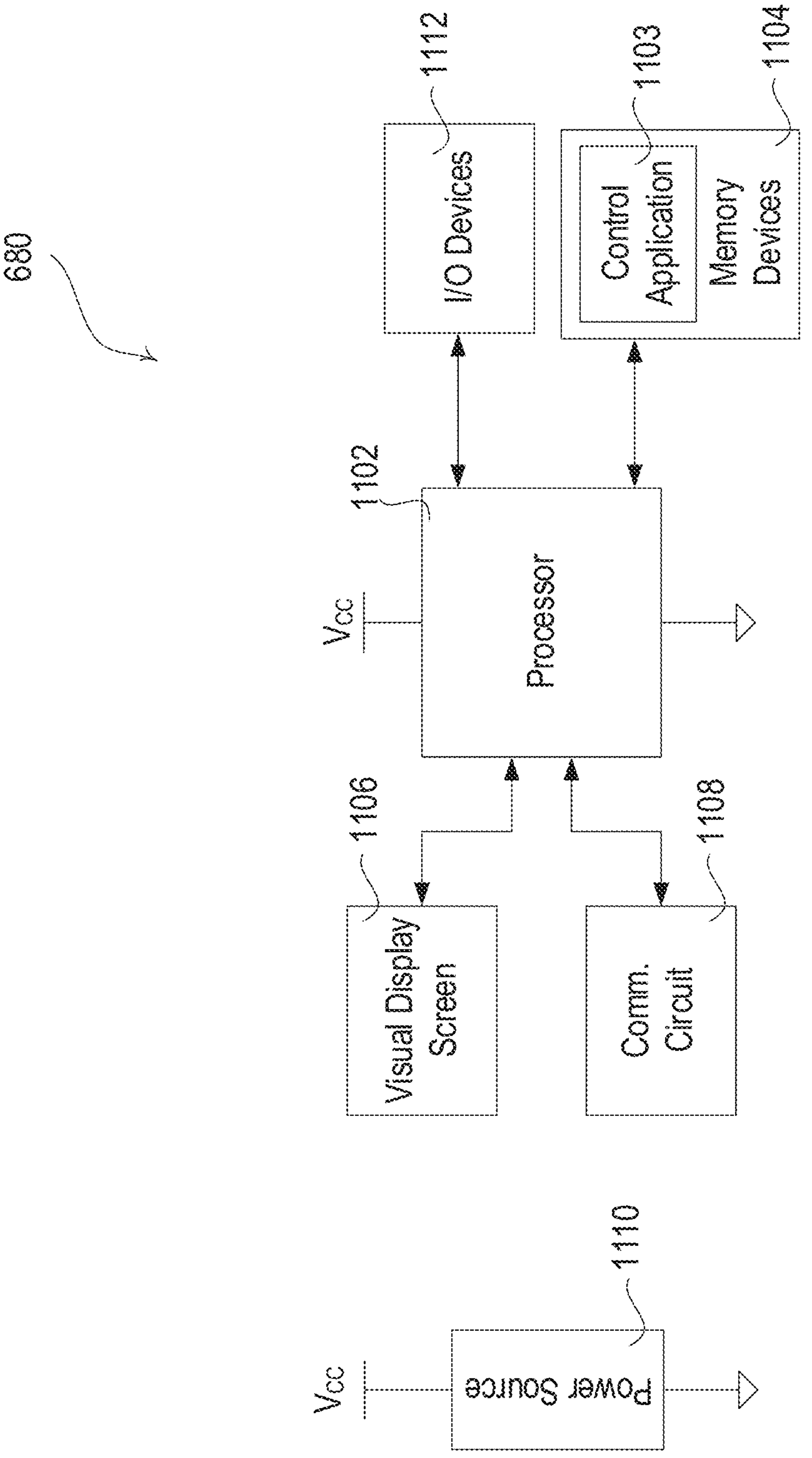
FIG. 4 is a block diagram of an example network device.

FIG. 4 shows an example block diagram of a network device 680 (such as a remote server, for example). Network device 680 may include one or more general purpose processors, special purpose processors, conventional processors, digital signal processors (DSPs), microprocessors, microcontrollers, integrated circuits, programmable logic devices (PLDs), field-programmable gate arrays (FPGAs), application specific integrated circuits (ASICs), or the like, and/or may further include other processing element, such as one or more graphic processors (hereinafter collectively referred to as processor 1102). Processor 1102 may control the functionality of the network device and may execute a control application 1103, in addition to other software applications, such as operating systems, database management systems, etc., to provide features and functions as describe herein. The processor 1102 may also perform signal coding, data processing, power control, input/output processing, and any other functionality that enables the network device 680 to perform as described herein. The network device 680 may also include one or more memory modules/devices 1104 (including volatile and non-volatile memory modules/devices) which may be non-removable memory modules/devices and/or removable memory modules/devices. Memory modules/devices 1104 may be communicatively coupled to the processor 1102. Non-removable memory modules/devices 1104 may include random-access memory (RAM), read-only memory (ROM), a hard disk, or any other type of non-removable memory storage. Removable memory modules/devices 1104 may include a subscriber identity module (SIM) card, a memory stick, a memory card, or any other type of removable memory. The one or more memory modules/devices 1104 may store the control application 1103 and may also provide an execution space as the processor executes the control application. Network device 680 may also include a visual display screen/terminal 1106 that may be communicatively coupled to the processor 1102. Together with the processor 1102, the visual display screen 1106 may display information to a user via one or more GUI-based interfaces/GUI-based "windows" as described herein. The display screen 1106 and the processor 1102 may be in two-way communication, as the display screen 1106 may include a touch-sensitive visual screen module configured to receive information from a user and to provide such information to the processor 1102. Network device 680 may also include one or more input/output (I/O) devices 1112 (e.g., a keyboard, a touch-sensitive pad, a mouse, a trackball, an audio speaker, an audio receiver, etc.) that may be communicatively coupled to the processor 1102. The I/O devices may allow the user to interact with the control application 1103, for example. Network device 680 may further include one or more transceivers or communications circuits (collectively, communications circuit 1108) for communicating (transmitting and/or receiving) over wired and/or wireless communication networks, for example. The communications circuit 1108 may include an RF transceiver or other circuit configured to perform wireless communication via an antenna. Communications circuit 1108 may be in communication with processor 1102 for transmitting and/or receiving information. Each of the modules within the network device 680 may be powered by a power source 1110. The power source 1110 may include an AC power supply and/or a DC power supply, for example. The power source 1110 may generate a supply voltage $V_{CC}$ for powering the modules within the network device 680.

In addition to including GUI-based software modules, for example, that provide graphical features and visual images described herein, the control application 1103 may also include a logic engine for providing features of the GUI and features of the application in general as described herein. The GUI-based software modules and/or logic engine may be one or more software-based modules that include instructions, for example, that may be stored on and/or executed from one or more tangible memory devices/modules of the network device as indicated above. Features of the control application may also be provided by firmware and/or hardware in addition to or as an alternative to software-based modules. Again, network device 680 is an example and the control application may execute on other types of computing devices.

As indicted, network device 680 may be like or representative of network devices or remote servers 160, 240, 250, 303*a*, 303*b*, 404*a*, and 404*b*, as described herein. Accordingly, the control application may communicate with a system controller via a network local to a user environment (such as a Wi-Fi network) similar to device 144 as described herein, and may communicate with a system controller using a message-based protocol (e.g., MQTT) and a message broker (e.g., a BPS 220). Nonetheless, one will recognize that the control application 1103 and/or network device 680 may communicate with a system controller using other communication systems and/or protocols, etc. In addition, the control application 1103 is described herein as being a self-contained application that executes on the network device and communicates messages with the system controller, for example. In other words, logic of the control application and generated graphics associated with the application are described herein as executing from the network device. Nonetheless, features and/or graphics of the control application may be implemented in other fashions, such as a web-hosted application with the network device interfacing with the web-hosted application using a local application (e.g., a web browser or other application) for providing features and functions as described herein.

Figure 5:
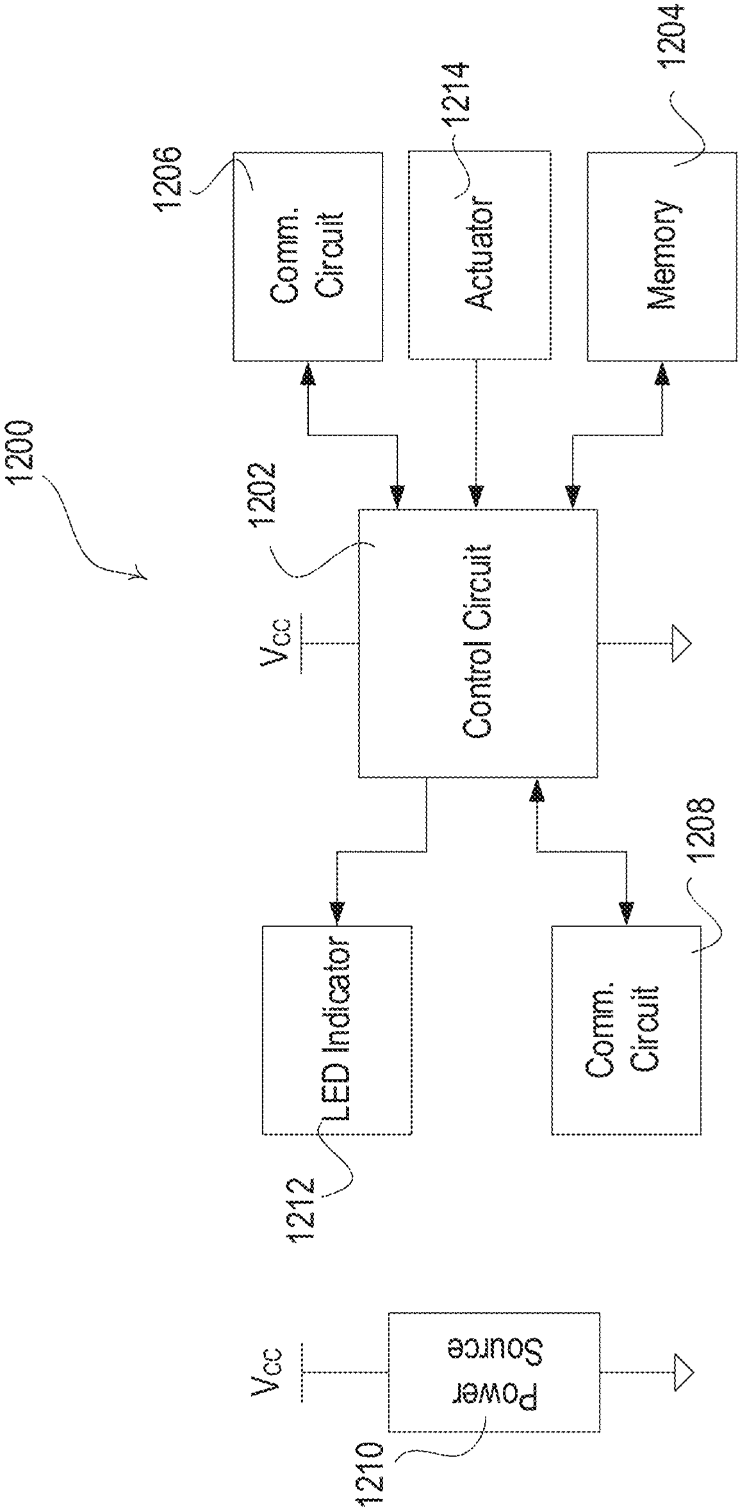
FIG. 5 is a block diagram of an example system controller.

FIG. 5 is a block diagram illustrating another example system controller 1200 (such as system controller 150 described herein). The system controller 1200 may include one or more general purpose processors, special purpose processors, conventional processors, digital signal processors (DSPs), microprocessors, microcontrollers, integrated circuits, programmable logic devices (PLDs), field programmable gate arrays (FPGAs), application specific integrated circuits (ASICs), or any suitable controller or processing device or the like (hereinafter collectively referred to as processor or control circuit 1202). The control circuit 1202 may be configured to execute one or more software-based applications that include instructions that, when executed by the control circuit, may configure the control circuit to perform signal coding, data processing, power control, input/output processing, or any other function, process, and/or operation, for example, that enables the system controller 1200 to perform as described herein. One will recognize that functions, features, processes, and/or operations described herein of the system controller 1200 may also be provided by firmware and/or hardware in addition to and/or as an alternative to software-based instructions. The control circuit 1202 may store information in and/or retrieve information from a memory 1204, including configuration information, configuration information files, backup files, creation times, and signatures, as described herein. Memory 1204 may also store software-based instructions for execution by the control circuit 1202 and may also provide an execution space as the control circuit executes instructions. Memory 1204 may be implemented as an external integrated circuit (IC) or as an internal circuit of the control circuit 1202. Memory 1204 may include volatile and/or non-volatile memory modules/devices and may be non-removable memory modules/devices and/or removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. One will appreciate that the memory used to store configuration information files, and/or backup files, and/or software-based instructions, etc., may be the same and/or different memory modules/devices of the system controller. As one example, configuration information files and software-based instructions may be stored in non-volatile memory modules/devices while backups may be stored in volatile and/or non-volatile memory modules/devices.

The system controller 1200 may include one or more communications circuits/network interface devices or cards 1206 for transmitting and/or receiving information. The communications circuit 1206 may perform wireless and/or wired communications. The system controller 1200 may also include one or more communications circuits/network interface devices/cards 1208 for transmitting and/or receiving information. The communications circuit 1206 may perform wireless and/or wired communications. Communications circuits 1206 and 1208 may be in communication with control circuit 1202. The communications circuits 1206 and/or 1208 may include radio frequency (RF) transceivers or other communications modules configured to perform wireless communications via one or more antennas. The communications circuit 1206 and communications circuit 1208 may be configured to perform communications via the same communication channels or different communication channels. For example, the communications circuit 1206 may be configured to communicate (e.g., with a network device, over a network, etc.) via a wireless communication channel (e.g., BLUETOOTH®, near field communication (NFC), WIFI®, WI-MAX®, cellular, etc.) and the communications circuit 1208 may be configured to communicate (e.g., with control devices and/or other devices in the load control system) via another wireless communication channel (e.g., WI-FI® or a proprietary communication channel, such as CLEAR CONNECT™).

The control circuit 1202 may be in communication with one or more LED indicators 1212 for providing indications to a user. The control circuit 1202 may be in communication with an actuator 1214 (e.g., one or more buttons, switches, knobs, or sliders) that may be actuated by a user to communicate user selections to the control circuit 1202. For example, the actuator 1214 may be actuated to put the control circuit 1202 in an association mode and/or communicate association messages from the system controller 1200.

Each of the modules within the system controller 1200 may be powered by a power source 1210. The power source 1210 may include an AC power supply or a DC power supply, for example. The power source 1210 may generate a supply voltage $V_{CC}$ for powering the modules within the system controller 1200. One will recognize that system controller 1200 may include other, fewer, and/or additional modules.

Figure 6:
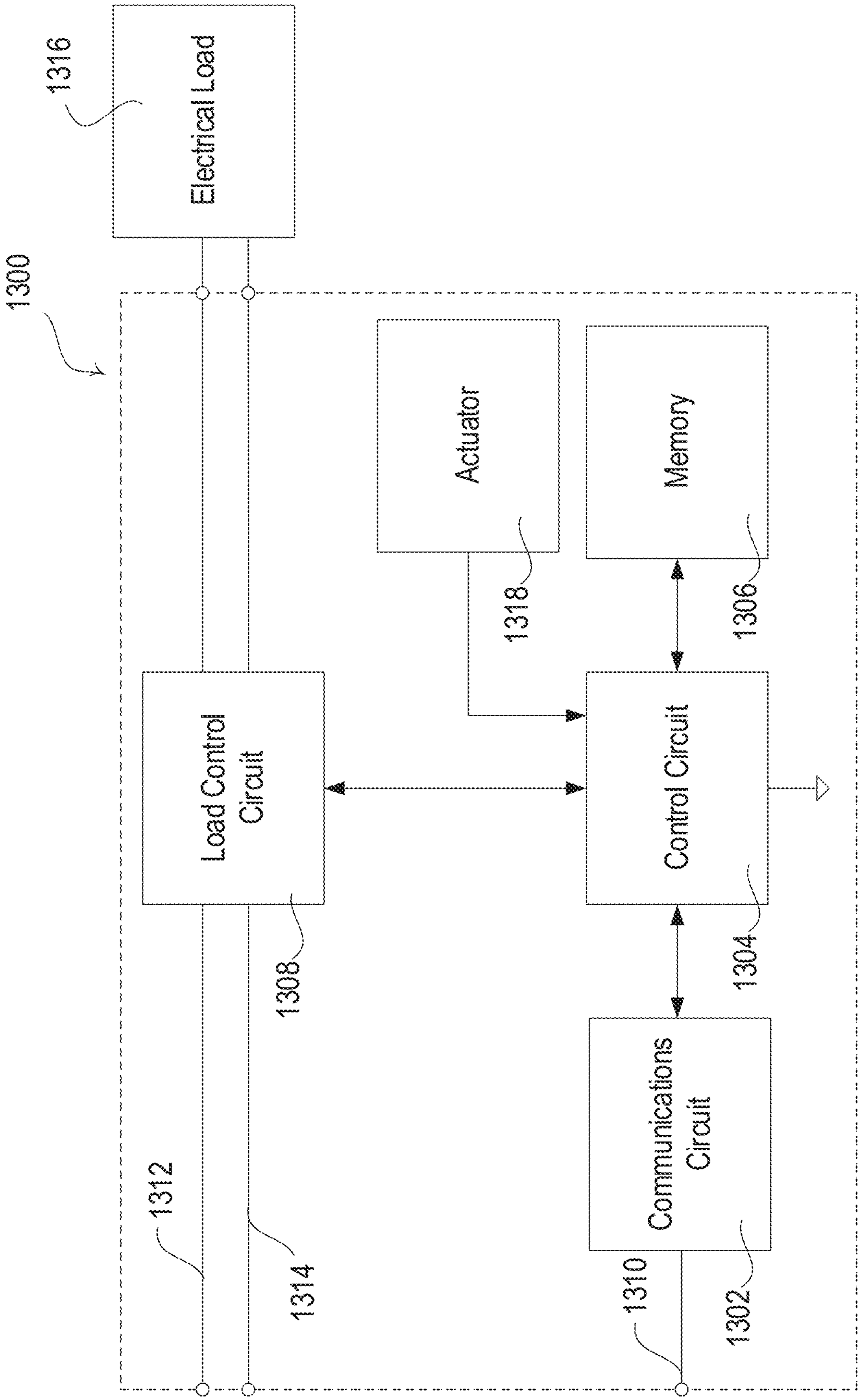
FIG. 6 is a block diagram of an example control-target device.

FIG. 6 is a block diagram illustrating an example control-target device 1300, e.g., a load control device, as described herein. The control-target device 1300 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The control-target device 1300 may be like or representative of the control-target devices 112, 113, 116, 124, and 126 described herein. The control-target device 1300 may include one or more communications circuits/network interface devices or cards 1302. The communications circuit 1302 may include a receiver, an RF transceiver, and/or other communications modules or circuits configured to perform wired and/or wireless communications via communications link 1310. The control-target device 1300 may include one or more general purpose processors, special purpose processors, conventional processors, digital signal processors (DSPs), microprocessors, microcontrollers, integrated circuits, programmable logic devices (PLDs), field programmable gate arrays (FPGAs), application specific integrated circuits (ASICs), or any suitable controller or processing device or the like (hereinafter collectively referred to as processors or control circuits 1304). The control circuit 1304 may be configured to execute one or more software-based applications that include instructions that, when executed by the control circuit, may configure the control circuit to perform signal coding, data processing, power control, input/output processing, or any other function, feature, process, and/or operation, for example, that enables the control-target device 1300 to perform as described herein. One will recognize that functions, features, processes, and/or operations. described herein for the control-target device 1300 may also be provided by firmware and/or hardware in addition to and/or as an alternative to software-based instructions. The control circuit 1304 may store information in and/or retrieve information from a memory 1306. For example, the memory 1306 may maintain a registry of associated control devices and/or control configuration information. Memory 1306 may also store software-based instructions for execution by the control circuit 1304 and may also provide an execution space as the control circuit executes instructions. Memory 1306 may be implemented as an external integrated circuit (IC) or as an internal circuit of the control circuit 1304. Memory 1306 may include volatile and/or non-volatile memory modules/devices and may be non-removable memory modules/devices and/or removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The control circuit 1304 may also be in communication with the communications circuit 1302.

The control-target device 1300 may include a load control circuit 1308. The load control circuit 1308 may receive instructions and/or control signals from the control circuit 1304 and may control an electrical load 1316 based on the received instructions and/or control signals. The load control circuit 1308 may provide status feedback to the control circuit 1304 regarding the status of the electrical load 1316. The load control circuit 1308 may receive power via a hot connection 1312 and a neutral connection 1314 and may provide an amount of power to the electrical load 1316. The electrical load 1316 may include any suitable type of electrical load.

The control circuit 1304 may be in communication with an actuator 1318 (e.g., one or more buttons, switches, knobs, or sliders) that may be actuated by a user to communicate user selections to the control circuit 1304. For example, the actuator 1318 may be actuated to put the control circuit 1304 in an association mode or discovery mode. The control-target device 1300 may communicate association messages or discovery messages via the communications circuit 1302. One will recognize that control-target device 1300 may include other, fewer, and/or additional modules and/or circuits than those described herein.

Figure 7:
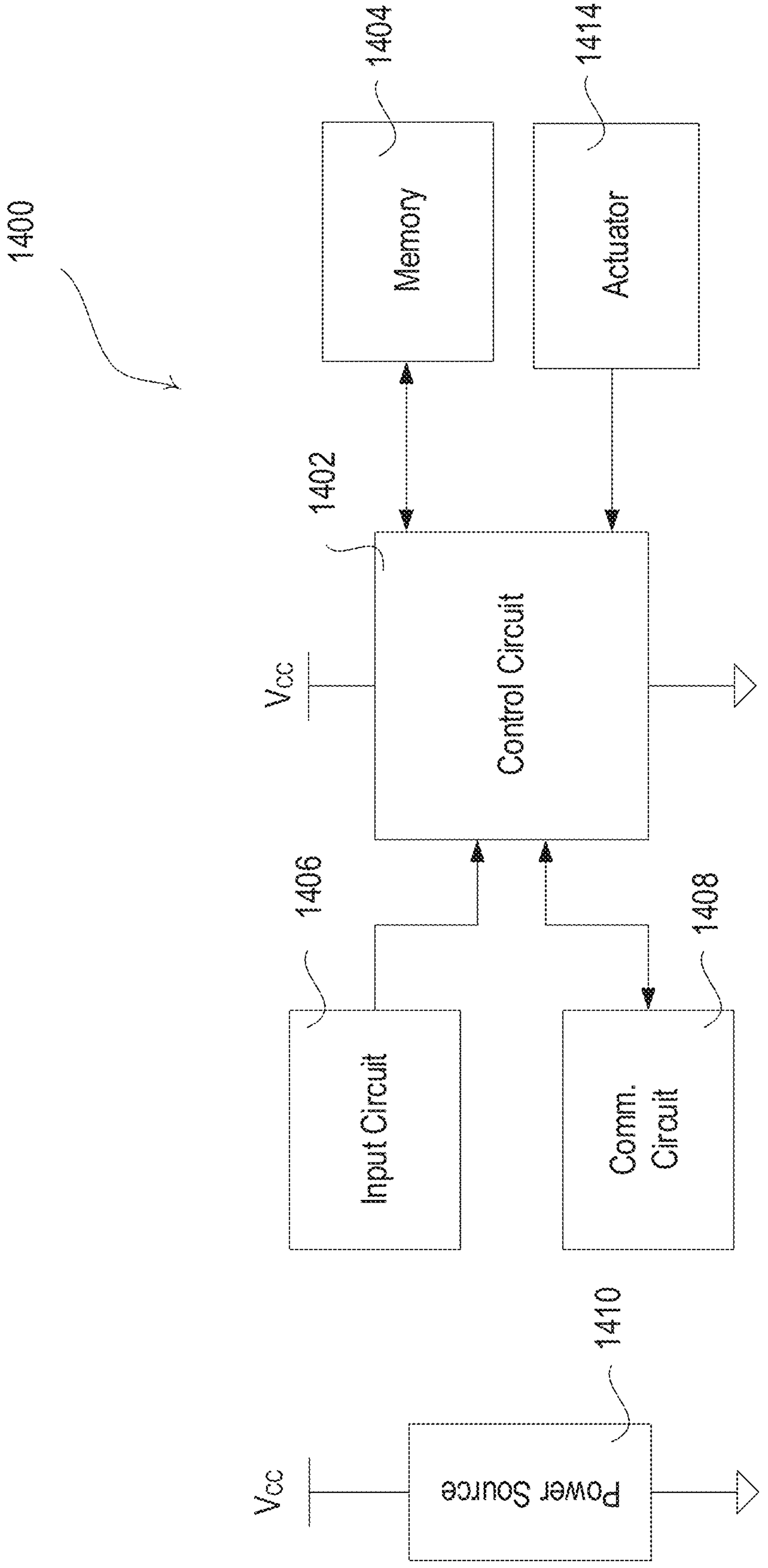
FIG. 7 is a block diagram of an example control-source device.

FIG. 7 is a block diagram illustrating an example control-source device 1400 as described herein. The control-source device 1400 may be a remote-control device, an occupancy sensor, a daylight sensor, a window sensor, a temperature sensor, and/or the like. The control-source device 1400 may be like or representative of the control-source devices 108, 110, 120, and 122 described herein. The control-source device 1400 may include one or more general purpose processors, special purpose processors, conventional processors, digital signal processors (DSPs), microprocessors, microcontrollers, integrated circuits, programmable logic devices (PLDs), field programmable gate arrays (FPGAs), application specific integrated circuits (ASICs), or any suitable controller or processing device or the like (hereinafter collectively referred to as processors or control circuits 1402). The control circuit 1402 may be configured to execute one or more software-based applications that include instructions that, when executed by the control circuit, may configure the control circuit to perform signal coding, data processing, power control, input/output processing, or any other function, feature, process, and/or operation, for example, that enables the control-source device 1400 to perform as described herein. One will recognize that functions, features, processes, and/or operations described herein for the control-source device 1400 may also be provided by firmware and/or hardware in addition to and/or as an alternative to software-based instructions. The control circuit 1402 may store information in and/or retrieve information from a memory 1404. Memory 1404 may also store software-based instructions for execution by the control circuit 1402 and may also provide an execution space as the control circuit executes instructions. Memory 1404 may be implemented as an external integrated circuit (IC) or as an internal circuit of the control circuit 1402. Memory 1404 may include volatile and/or non-volatile memory modules/devices and may be non-removable memory modules/devices and/or removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The control-source device 1400 may include one or more communications circuits/network interface devices or cards 1408 for transmitting and/or receiving information. The communications circuit 1408 may transmit and/or receive information via wired and/or wireless communications via communications circuit 1408. The communications circuit 1408 may include a transmitter, an RF transceiver, and/or other circuit configured to perform wired and/or wireless communications. The communications circuit 1408 may be in communication with control circuit 1402 for transmitting and/or receiving information.

The control circuit 1402 may also be in communication with an input circuit 1406. The input circuit 1406 may include an actuators (e.g., one or more buttons, switches, knobs, or sliders) and/or a sensor circuit (e.g., an occupancy sensor circuit, a daylight sensor circuit, or a temperature sensor circuit) for receiving input that may be sent to a control-target device for controlling an electrical load. For example, the control-source device may receive input from the input circuit 1406 to put the control circuit 1402 in an association mode and/or communicate association messages from the control-source device. The control circuit 1402 may receive information from the input circuit 1406 (e.g., an indication that a button has been actuated or sensed information). Each of the modules within the control-source device 1400 may be powered by a power source 1410. One will recognize that control-source device 1400 may include other, fewer, and/or additional modules and/or circuits than those described herein.

In addition to what has been described herein, the methods and systems may also be implemented in a computer programs, software, or firmware incorporated in one or more computer-readable media for execution by a computer or a processor, for example. Examples of computer-readable media include electronic signals (transmitted over wired or wireless connections) and tangible/non-transitory computer-readable storage media. Examples of tangible/non-transitory computer-readable storage media include, but are not limited to, a read-only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

The invention claimed is:

1. A load control system, comprising:

a control device for controlling an electrical load associated with one or more of a lighting system, a heating and air conditioning (HVAC) system, or a motorized window shade system; and a broker provisioning service (BPS) device for facilitating connection between the control device and one or more remote servers for receiving information about the electrical load being controlled by the control device, wherein the BPS device is configured to:

receive a connection request message associated with the control device from the control device, identifying the control device by one or more of a device identifier, ID, a device type, a serial number, a media access control, MAC, address, location information, authorization information, or a universal identifier;

select at least one of the one or more remote servers;

send to the selected one or more remote servers a connection establishment message identifying the control device; and send the control device an identifier of the selected one or more remote servers; and wherein the control device is configured to:

establish a connection with the selected one or more remote servers;

receive information from the selected one or more remote servers pertaining to the electrical load; and use the received information to control the electrical load.

2. The load control system of claim 1, wherein the control device is further configured to send information to the selected one or more remote servers about the controlled electrical load.

3. The load control system of claim 1, wherein the control device is further configured to automatically establish a connection with the BPS when the control device powers on or restarts.

4. The load control system of claim 1, wherein the control device is further configured to execute a multi-server firmware.

5. The load control system of claim 4, wherein the control device establishes parallel connections with at least two selected remote servers.

6. The load control system of claim 5, wherein the control device is further configured to determine whether a first of the two selected remote servers is unavailable, and, if so, communicate with a second of the two selected remote servers.

7. The load control system of claim 5, wherein the at least two selected remote servers differ in storage capacity.

8. The load control system of claim 1, wherein the control device is further configured to receive, from the BPS, information associated with the selected one or more remote servers, the information comprising, for each corresponding remote server, one or more of a broker ID, a service ID, or a credential.

9. The load control system of claim 8, wherein the control device is further configured to establish the connection with the selected one or more remote servers using at least one of the corresponding broker ID, service ID, or credential.

10. The load control system of claim 1, wherein the received information pertaining to the electrical load is based on a control message published by a mobile device on the selected one or more remote servers, wherein the mobile device received an identifier of the selected one or more remote servers from the BPS.

11. A load control system, comprising:

a control device for controlling an electrical load associated with a lighting system; and a broker provisioning service (BPS) device for facilitating connection between the control device and one or more remote servers for receiving information about the electrical load being controlled by the control device, wherein the BPS device is configured to:

receive a connection request message associated with the control device from the control device, identifying the control device by one or more of a device identifier, ID, a device type, a serial number, a media access control, MAC, address, location information, authorization information, or a universal identifier;

select at least one of the one or more remote servers;

send to the selected one or more remote servers a connection establishment message identifying the control device; and send the control device an identifier of the selected one or more remote servers; and wherein the control device is configured to:

establish a connection with the selected one or more remote servers;

receive information from the selected one or more remote servers pertaining to the electrical load; and use the received information to control the electrical load.

12. The load control system of claim 11, wherein the control device is further configured to send information to the selected one or more remote servers about the controlled electrical load.

13. The load control system of claim 11, wherein the control device is further configured to automatically establish a connection with the BPS when the control device powers on or restarts.

14. The load control system of claim 11, wherein the control device is further configured to execute a multi-server firmware.

15. The load control system of claim 14, wherein the control device establishes parallel connections with at least two selected remote servers.

16. The load control system of claim 11, wherein the received information pertaining to the electrical load is based on a control message published by a mobile device on the selected one or more remote servers.

17. The load control system of claim 16, wherein the control device is further configured to receive information from the mobile device only through the selected one or more remote servers.

18. The load control system of claim 11, wherein the control device is further configured to publish a load control message on the selected one or more remote servers indicating that the lighting system has been controlled.

19. The load control system of claim 11, wherein the BPS is further configured to:

receive information from a mobile device seeking association with the control device to control the electrical load;

send information identifying the mobile device to the selected one or more remote servers; and send the mobile device an identifier of the selected one or more remote servers.

20. The load control system of claim 11, wherein the BPS is further configured to receive a request from the control device to reconnect to the BPS.

21. The load control system of claim 11, wherein the BPS is further configured to send to the control device updated provision information about the selected one or more remote servers.

* * * * *